(12) United States Patent
Johnson et al.

(10) Patent No.: US 11,238,717 B2
(45) Date of Patent: Feb. 1, 2022

(54) PROXIMITY-BASED PERSONNEL SAFETY SYSTEM AND METHOD

(71) Applicant: Transocean Sedco Forex Ventures Limited, Grand Cayman (KY)

(72) Inventors: Paul Johnson, Houston, TX (US); Travis McGuire, Houston, TX (US)

(73) Assignee: Transocean Sedco Forex Ventures Limited, Grand Cayman (KY)

( * ) Notice: Subject to any disclaimer, the term of this patent is extended or adjusted under 35 U.S.C. 154(b) by 0 days.

(21) Appl. No.: 17/114,892

(22) Filed: Dec. 8, 2020

(65) Prior Publication Data
US 2021/0192915 A1 Jun. 24, 2021

Related U.S. Application Data

(63) Continuation of application No. 16/689,759, filed on Nov. 20, 2019, now Pat. No. 10,885,758.
(Continued)

(51) Int. Cl.
*G08B 21/02* (2006.01)
*G01S 17/86* (2020.01)
(Continued)

(52) U.S. Cl.
CPC .............. *G08B 21/02* (2013.01); *G01S 17/86* (2020.01); *G01S 17/93* (2013.01); *G06K 9/00362* (2013.01); *H04W 4/021* (2013.01)

(58) Field of Classification Search
CPC ......... G08B 21/02; G01S 17/86; G01S 17/93; G06K 9/00362; H04W 4/021; F16P 3/147
(Continued)

(56) References Cited

U.S. PATENT DOCUMENTS

| 5,751,927 A | 5/1998 | Wason |
| 6,430,997 B1 | 8/2002 | French et al. |

(Continued)

FOREIGN PATENT DOCUMENTS

| WO | WO 2011/036414 A1 | 3/2011 |
| WO | WO 2011/123741 A2 | 10/2011 |

(Continued)

OTHER PUBLICATIONS

Non-Final Office Action issued by The United States Patent and Trademark Office for U.S. Appl. No. 16/689,759, dated Mar. 20, 2020, 6 pages.
(Continued)

*Primary Examiner* — Eric Blount
(74) *Attorney, Agent, or Firm* — Cooley LLP

(57) ABSTRACT

A method includes receiving first position data from at least one of a TOF sensor or a LIDAR. The first position data is representative of a position of a human within a hazardous environment. The method further includes receiving second position data associated with a plurality of wearable sensors associated with a plurality of personnel. The method further includes comparing the first position data to the second position data to identify a match between the first position data and the second position data. The method further includes sensing a signal to an alert device associated with the hazardous environment such that the alert device issues an alert in response to the first position data failings to match the second position data.

29 Claims, 20 Drawing Sheets
(11 of 20 Drawing Sheet(s) Filed in Color)

Related U.S. Application Data

(60) Provisional application No. 62/769,790, filed on Nov. 20, 2018.

(51) Int. Cl.
*G01S 17/93* (2020.01)
*G06K 9/00* (2006.01)
*H04W 4/021* (2018.01)

(58) Field of Classification Search
USPC .......................................... 340/539.23, 565
See application file for complete search history.

(56) References Cited

U.S. PATENT DOCUMENTS

| | | | |
|---|---|---|---|
| 7,084,867 B1 | 8/2006 | Ho | |
| 9,396,398 B2 | 7/2016 | Kozicz et al. | |
| 9,513,606 B1 | 12/2016 | Larsen et al. | |
| 9,836,941 B2 | 12/2017 | Mendiola et al. | |
| 10,235,857 B2 | 3/2019 | Jones | |
| 10,402,662 B2 | 9/2019 | Kozicz et al. | |
| 10,427,597 B2 | 10/2019 | Hanninen | |
| 10,885,758 B2 | 1/2021 | Johnson et al. | |
| 2007/0028119 A1 | 2/2007 | Mirho | |
| 2008/0239076 A1 | 10/2008 | Luo | |
| 2010/0245372 A1 | 9/2010 | Gedik et al. | |
| 2011/0273293 A1 | 11/2011 | Itkin | |
| 2011/0279261 A1 | 11/2011 | Gauger | |
| 2011/0298579 A1 | 12/2011 | Hardegger | |
| 2012/0025964 A1 | 2/2012 | Beggs | |
| 2012/0123563 A1 | 5/2012 | Drinkard | |
| 2013/0307978 A1 | 11/2013 | Kriel | |
| 2014/0107971 A1 | 4/2014 | Engedal | |
| 2014/0277726 A1* | 9/2014 | Nakamura | B25J 9/1612 700/255 |
| 2014/0307076 A1 | 10/2014 | Deutsch | |
| 2014/0348385 A1 | 11/2014 | Kozicz et al. | |
| 2016/0292513 A1 | 10/2016 | Kozicz et al. | |
| 2017/0124836 A1* | 5/2017 | Chung | H04B 7/14 |
| 2018/0136625 A1 | 5/2018 | Graves et al. | |
| 2018/0170250 A1* | 6/2018 | Hanninen | B60Q 5/006 |
| 2018/0364693 A1 | 12/2018 | Harshbarger | |
| 2020/0064433 A1 | 2/2020 | Finley et al. | |
| 2020/0099893 A1 | 3/2020 | Pratt et al. | |
| 2020/0160682 A1 | 5/2020 | Johnson | |
| 2020/0202135 A1 | 6/2020 | Kozicz et al. | |

FOREIGN PATENT DOCUMENTS

| | | |
|---|---|---|
| WO | WO 2019/186202 A1 | 10/2019 |
| WO | WO 2020/044014 A1 | 3/2020 |

OTHER PUBLICATIONS

International Search Report and Written Opinion issued by the International Searching Authority for Application No. PCT/US2019/000071, dated Apr. 2, 2020, 13 pages.

Non-Final Office Action issued by The United States Patent and Trademark Office for U.S. Appl. No. 16/689,759, dated Jul. 17, 2020, 9 pages.

Interview Summary issued by The United States Patent and Trademark Office for U.S. Appl. No. 16/689,759, dated Aug. 4, 2020, 4 pages.

Non-Final Office Action issued by The United States Patent and Trademark Office for U.S. Appl. No. 16/555,179, dated Sep. 15, 2020, 21 pages.

Lee et al. "Monitoring Activities from Multiple Video Streams: Establishing a Common Coordinate Frame," IEEE Transactions on Pattern Analysis and Machine Intelligence. 22(8):758-767 (2000).

J Ye and KA Hua, "Exploiting Depth Camera for 3D Spatial Relationship Interpretation," MMSys 2013 Conference, Feb. 26-Mar. 1, 2013, Oslo, Norway, pp. 151-161.

\* cited by examiner

PROXIMITY-BASED PERSONNEL SAFETY SYSTEM AND METHOD

CROSS-REFERENCE TO RELATED APPLICATIONS

This application is a continuation of U.S. application Ser. No. 16/689,759, entitled "Proximity-Based Personnel Safety System and Method", filed Nov. 20, 2019, (now U.S. Pat. No. 10,885,758, which claims priority to U.S. Provisional Application No. 62/769,790 entitled "Proximity-Based Personnel Safety System and Method", filed Nov. 20, 2018, the entire disclosure of each of which is incorporated herein by reference.

BACKGROUND

The present disclosure relates generally to the field of control systems and methods, and in particular, to computer vision-based collision avoidance control in drilling operations.

Oil and gas drilling operations have evolved over the years to include multiple automated tool subsystems. Automated tool subsystems, machines, equipment, and the like, aid in executing repetitive tasks on the drill floor including, for example, drilling, tripping, casing, and cementing. Tool automation optimizes the rate of penetration, makes hole quality more consistent, reduces operation time, improves overall drilling performance, and reduces the cost of drilling operations. More importantly, tool automation reduces the number of people required to work in and around the hazardous drill floor environment. The overwhelming majority of drilling operations are not fully automated, therefore some tasks are still performed by humans working alongside heavy drilling machinery. The automated tool subsystems pose new challenges for maintaining a safe workspace for personnel, where people and machines must share the same operating environment.

SUMMARY

According to various aspects of the present disclosure, a computer-implemented method, computer system, and/or a computer program product is provided. In an aspect, the method may include receiving an image that was captured by an optical camera disposed to capture images of a drill rig floor, and conducting image analytics on the image to identify a human within a predefined zone, the predefined zone being associated with a movable machine operable on the drill rig floor. The method may further include receiving a first signal from a time of flight (TOF) sensor or a light detection and ranging (Lidar) sensor, identifying that the human is within the predefined zone based on the first signal, and in response to the identification of the human within the predefined zone from the image analytics or the first signal, sending a second signal to an alert device such that the alert device issues an alert detectable from the predefined zone.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
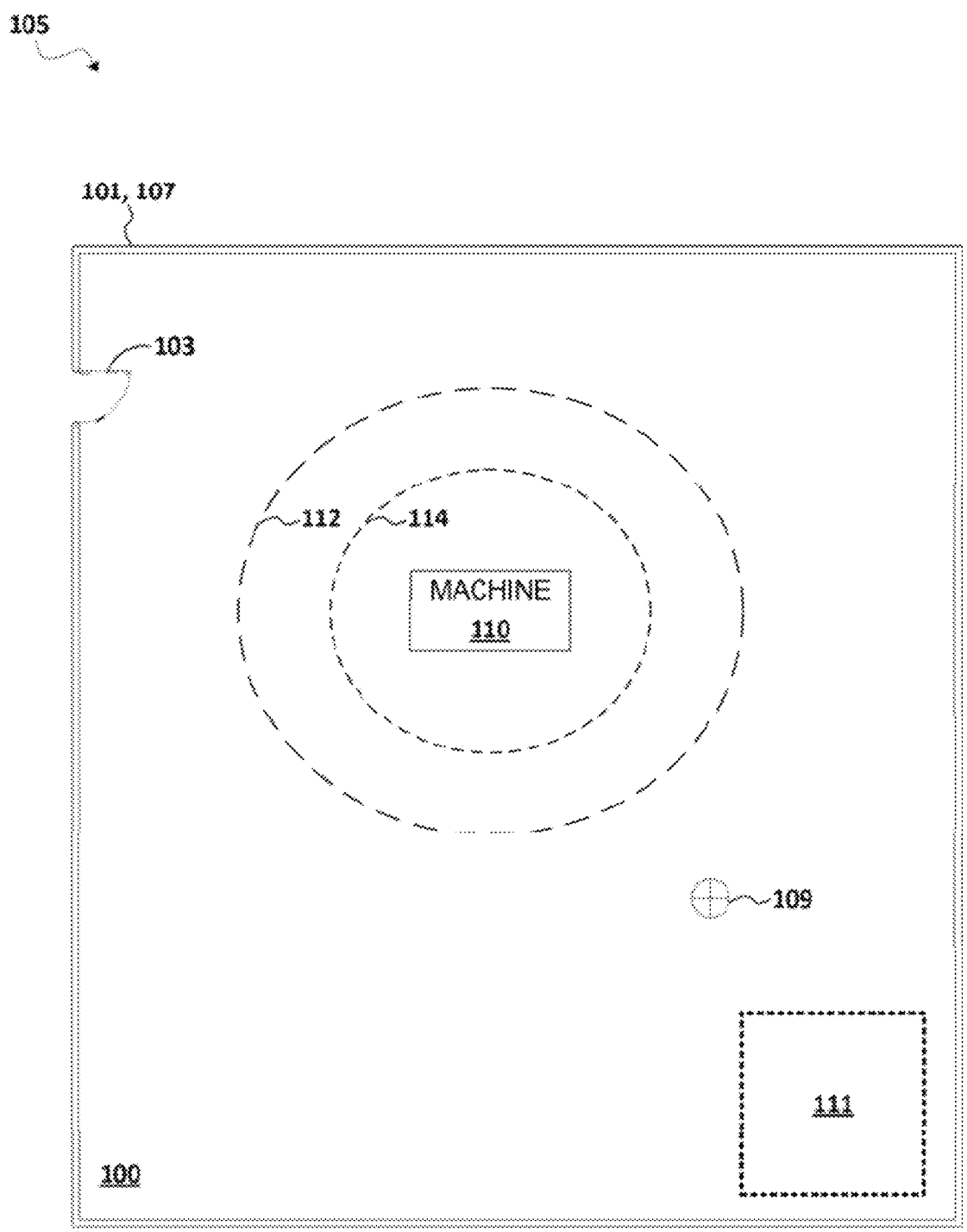
FIG. 1 is a schematic diagram depicting an example of a personnel safety system 105 applied within a hazardous environment, in accordance with an embodiment.

Collision avoidance is a component of automated tool subsystems that can be configured to mitigate or reduce the possibility of collision between tools, machines, and/or people. These types of systems are known by various names, for example: anti-collision systems (ACS), collision avoidance systems (CAS), zone management systems (ZMS). In some tool collision avoidance applications, virtual and real world coordinate systems are defined and correlated to provide virtual operating environments, including, for example, environments corresponding to hazardous, real world environments, such as drill floor spaces, and/or the like. In some instances, a bounding box surrounds a tool in virtual space and establishes a volume occupied by the tool. The bounding box may also be axis-aligned, in which case the virtual space surrounding the tool changes dynamically as the tool appendages extend, rotate, retract, raise, lower, etc. A proximity zone surrounds the bounding box and defines a hazardous area around the tool. Some collision avoidance systems can monitor tool positions and movement, and predict a location or trajectory of a moving tool. Further, some collision avoidance systems can override automated tool operations to prevent a virtual overlap of the projected bounding boxes, which may correspond to a real-world tool collision.

Despite movement in various industries towards automated tool subsystems, in many industries, personnel continue to be a necessary component to various operations, particularly in conjunction with tools and machines. In the drilling industry, for example, personnel such as drill hands continue to be a necessary component of the drilling operation. Drill floor personnel are a dynamic component of the drilling operation that are not monitored by existing tool collision avoidance systems. Collision avoidance, for example, between drill floor personnel and automated tools depends on the situational awareness of the rig hands (i.e., drill floor personnel). The avoidance of an automated tool presents an unnecessary distraction to a drill hand in an already hazardous environment. And, to date, persons' individual positions on the drill floor relative to equipment has not been considered outside of procedural control through the application of the restricted access principle, and of the hierarchy of control that focuses on procedural control.

Accordingly, there is a need in the art for systems and methods for computer vision-based collision avoidance and control of machines in motion with respect to individual personnel, such as for use in hazardous environments, and the like. A hazardous environment may include, for example, a cooperative human-machine workspace or environment such as a drill floor before, during, or after an occurrence of a drilling operation in the environment. In some instances, it is contemplated that the systems and methods can include and/or be implemented in conjunction with devices such as wearable devices (e.g., smart electronic devices that can be incorporated into clothing, gear (e.g. helmet), or otherwise worn on the body), machine sensors (e.g., native machine sensor and/or instrumentation, or sensors added to the machines), and/or the like, in an effort to collect data such that the machines and personnel can be suitably monitored to avoid collisions. For example, the wearable devices can be configured to be worn by the personnel, and the machine sensors can be integrated into the machines in motion for use in the monitoring and/or control of the machines in motion with respect to the individual personnel, as described in further detail herein.

Embodiments of the present disclosure are directed to systems and methods for and to improve personnel safety, in which imaging modalities, wearables (e.g., wearable safety devices), and/or machine sensors are used to promote collision avoidance between personnel and machines in motion based on communications and interoperation therebetween. Such personnel safety systems may be implemented in hazardous environments including, for example, oil rigs, drill floors, drill rig floors, radioactive, contaminated, biohazardous environments, and/or the like, as described in further detail herein.

Advantageously, such personnel safety systems provide a solution for the aforementioned need in the art—that is, the need for a system and method of collision avoidance control over one or more machines in motion with respect to individual personnel. In particular, embodiments described herein may be implemented to enable, facilitate, and support proximity-based safety and authorization of personnel with respect to movements or operations of the one or more machines in motion, such as for use in hazardous environments, cooperative or same-space human-machine industrial operations, and the like. To that end, the embodiments may be implemented to mitigate and reduce operational risk as well as to support and increase the efficiency and cost-effectiveness of cooperative, human-machine industrial operations and tasks, such as may be performed in industry, as previously described. Other advantages may be readily apparent to those of skill in the art in view of the present disclosure.

For purposes of the present disclosure, a "machine in motion," "movable machine," and the like, refers to any type of automation, machinery, and/or equipment used in industry. For example, in some cases a machine in motion may include an automated tool subsystem or automated machinery or equipment, such as in the form of a wholly or partially automated drill, crane, gantry, pipe racker, iron roughneck, riser skate, pipe skate, stand building, pipe tripping, and/or any other type of load-bearing equipment as such may be used in the industry. In any case, a machine in motion may include any type of automation or semi-automation capable of causing physical harm or damage to a human, such as by collision.

For purposes of the present disclosure, "personnel" refers to one or more people, persons, humans, or workers exposed to risk of collision or impact with one or more machines in motion, such as in a hazardous environment, as previously described. For example, in some cases one or more personnel may include drill floor personnel such as a drill hand. In other cases, one or more personnel may include, for example, emergency relief personnel and/or related first responders. In any case, personnel may include any type of entity exposed to risk of harm or damage, such as by collision.

For purposes of the present disclosure, a "hazardous environment" refers to an environment, volume, space, or area in which a cooperative, human-machine industrial operation or task may be performed. In some cases, a hazardous environment may include one having poor, bad, unideal, or otherwise harsh environmental conditions. For example, a harsh environmental condition may be caused by exposure of the environment to extreme or severe weather, an occurrence of an explosion or smoke in the environment, hazardous materials, and the like. In any case, a harsh environmental condition may include any environmental condition in the environment by which unsuitable operating conditions may be caused and occur in the environment. For example, during a first time period a hazardous environment may include harsh environmental conditions (e.g. as in severe weather, etc.), and during a second time period may not include harsh environmental conditions (e.g., as in calm weather, etc.). Accordingly, during the second time period, the harsh environmental conditions may increase a risk of collision or impact between personnel and one or more machines in motion, such as by causing reduced visibility in the environment, and so on. In any case, a hazardous environment may include any type of environment or space that may be concurrently or simultaneously occupied or shared by personnel and one or more machines in motion.

In some embodiments, a method includes receiving first position data from a time of flight (TOF) sensor or a light detection and ranging (LIDAR) sensor. The first position data is representative of a position of a human within a hazardous environment. The method further includes receiving second position data associated with a plurality of wearable sensors associated with a plurality of personnel. The method further includes comparing the first position data to the second position data to identify a match between the first position data and the second position data. A match is indicative that the human is authorized to be within the hazardous environment. The method further includes sending a signal to an alert device associated with the hazardous environment such that the alert device issues an alert in response to the first position data failing to match the second position data.

In some embodiments, a method includes receiving position data associated with a wearable sensor (1) that is located within a hazardous environment, and (2) that is associated with a human. The method further includes comparing the position data with a predefined zone within the hazardous environment. The predefined zone is defined based on motion of a movable machine within the hazardous environment. The method further includes sending a signal to an alert device such that the alert device issues an alert, in response to the comparison of the position data with the predefined zone indicating that the position data falls within the predefined zone.

In some embodiments, a method includes receiving an image that was captured by an optical camera disposed to capture images of a hazardous environment. The method further includes conducting image analytics on the image to detect a human and a movable machine within the hazardous environment. The method further includes receiving first position data from a TOF sensor or a first LIDAR sensor. The first position data is representative of a position of the human within the hazardous environment. The method further includes receiving second position data from (1) the first TOF sensor or a second TOF sensor, or (2) the first LIDAR sensor or a second LIDAR sensor. The second position data is representative of a position of the movable machine within the hazardous environment. The method further includes comparing the first position data with the second position data to produce a comparison identifier. The method further includes sensing a signal to an alert device associated with the hazardous environment such that the alert device issues an alert in response to the comparison identifier meeting a threshold.

In some embodiments, a method includes receiving first position data from a time of flight (TOF) sensor or a light detection and ranging (LIDAR) sensor. The first position data is representative of a position of a human within a hazardous environment. The method further includes receiving second position data associated with the human and from a wearable sensor being worn by the human within the hazardous environment. The method further includes comparing the first position data to the second position data to identify a match between the first position data and the second position data. The method further includes receiving third position data from a sensor operably coupled to a movable machine and representative of a location of the movable machine within the hazardous environment. The method further includes sending a signal to an alert device such that the alert device issues an alert based on (1) the identified match between the first position data and the second position data, and (2) the third position data.

In some embodiments, a method includes receiving an image that was captured by an optical camera disposed to capture images of a hazardous environment, and conducting image analytics on the image to detect a human within a predefined zone. The predefined zone is associated with a movable machine operable in the hazardous environment. The method further includes receiving a first signal from a time of flight (TOF) sensor or a light detection and ranging (LIDAR) sensor. The method further includes detecting that the human is within the predefined zone based on the first signal. The method further includes determining that the human is authorized to be within the predefined zone based on a wearable identifier being worn by the human within the predefined zone. The method further includes receiving a second signal from the TOF sensor or the LIDAR sensor. The method further includes detecting that the human is within the predefined warning zone based on the second signal. The method further includes, in response to the detection that the human is within the predefined warning zone from the image analytics on the second image or the second signal, sending a third signal to a wearable alert device that is being worn by the human such that the alert device issues an alert detectable by the human.

In some embodiments, a method includes receiving an image that was captured by an optical camera disposed to capture images of a hazardous environment. The method further includes conducting image analytics on the image to detect a human within a predefined zone. The predefined zone is associated with a movable machine operable in the hazardous environment. The method further includes receiving a first signal from a time of flight (TOF) sensor or a light detection and ranging (LIDAR) sensor. The method further includes detecting that the human is within the predefined zone based on the first signal. The method further includes, in response to the detection of the human within the predefined zone from the image analytics or the first signal, sending a second signal to an alert device such that the alert device issues an alert detectable from the predefined zone.

In some embodiments, a method includes receiving an image that was captured by an optical camera disposed to capture images of a hazardous environment. The method further includes conducting image analytics on the image to detect a human within a predefined zone. The predefined zone is associated with a movable machine operable in the hazardous environment. The method further includes detecting that the human is within the predefined zone based on the first signal. The method further includes determining an identity of the human based on a wearable identifier being worn by the human within the predefined zone. The method further includes, in response to determining based on the identity that the human is not authorized to be within the predefined zone, sending a second signal to an alert device such that the alert device issues an alert.

FIG. 1 is a schematic diagram depicting a personnel safety system 105 applied to a hazardous environment 100, in accordance with an embodiment. As described in further detail herein, the personnel safety system 105 can be used to monitor the hazardous environment 100 and take remedial action (e.g., issue alerts, alarms, or instructions to personnel, and/or signals to control and/or shutdown machinery) when appropriate. As shown, the hazardous environment 100 includes a defining boundary 101, an entry/exit 103, a machine 110, and a human 109. The personnel safety system 105 includes a virtual defining boundary 107, a first virtual zone 112, and a second virtual zone 114. As described in further detail herein, the virtual defining boundary 107, the first virtual zone 112, and the second virtual zone 114 can be used to identify locations within the hazardous environment 100 within which intrusion detection (e.g., personnel crossing into one or more of the zones) is of interest (e.g., for safety and/or avoidance of potential machine and human collision). Such zones can be defined in any suitable manner, having any suitable shape and/or size. As an example, in this embodiment, the first virtual zone 112 and the second virtual zone 114 are circumferentially and concentrically disposed about the machine 110, as shown. In other embodiments, the first virtual zone 112 and/or the second virtual zone 114 may be disposed, for example, partially about the machine 110 or in any other suitable configuration in relation to the machine 110 and/or components within the hazardous environment 100, as described in further detail herein. In some embodiments, for example, one or more virtual zones can be defined based on expected motion of the machine and/or personnel in connection with an operation. In such embodiments, for example, if a machine is expected to move along a linear pathway, a virtual zone associated with that machine could be rectangular and disposed about that linear pathway.

While FIG. 1 depicts the hazardous environment 100 as including only one defining boundary, one machine, one entry/exit, and one human, in other embodiments, any number of suitable boundaries, machines, entries/exits, and humans can be included. For example, in other embodiments, a hazardous environment may include two or more machines and/or two or more humans. Similarly, although FIG. 1 depicts only two virtual zones, in other embodiments, a personnel safety system may include or define any suitable number of virtual zones. For example, in some embodiments, three or more virtual zones may be used. As another example, in some embodiments, only one virtual zone may be used.

The hazardous environment 100 may include a three dimensional space or volume delimited or defined by the defining boundary 101, and also, in some cases, the entry/exit 103. In some implementations, for example, the hazardous environment 100 may include a drill floor, pipe deck, or the like, having a perimeter delimited or defined by the defining boundary 101. The machine 110 and the human 109 may be concurrently located, positioned, or otherwise situated in the hazardous environment 100 within the three dimensional space delimited by the defining boundary 101, such as during an industrial operation. For example, the industrial operation may include a drilling operation, a riser-running or riser-pulling operation, a stand-running operation, a pipe standing operation, or the like. In general, the hazardous environment 100 may include any environment in which personnel may be subject to danger, such as by exposure to risk of collision with one or more machines in motion in the environment, as described herein. Further, the industrial operation may include any human-machine industrial operation or task, such as may be performed in industry, in accordance with the present disclosure.

The defining boundary 101 may include a physical or virtual boundary. In some implementations, the defining boundary 101 may include, for example, a physical boundary such as a surface (e.g. of a floor, wall, ceiling, structure, etc.), a physical or digital demarcation such as a visible line or mark on a floor, or the like. In some implementations, the defining boundary 101 may additionally or alternatively include, for example, a virtual boundary such as a digital demarcation (e.g. visibly indicated by projection from a light source). Generally, the defining boundary 101 may include or implement any suitable type of boundary—physical, virtual, or otherwise—in delimiting the hazardous environment (e.g. hazardous environment 100).

In some implementations, for example, the defining boundary 101 may function as an authorization boundary or perimeter of the hazardous environment 100 beyond which authorized personnel may be permitted and unauthorized personnel may not. For example, the personnel safety system 105 may monitor the hazardous environment 100 to determine whether personnel are authorized to be present in the hazardous environment 100, and, where unauthorized personnel are determined to be present, subsequently perform a remedial action to reduce a risk of collision, such as by issuing an alert with respect to the unauthorized personnel and/or a surrounding area in the hazardous environment 100, as described in further detail herein. The entry/exit 103 may include, for example, an ingress, entryway, entrance, egress, exit, or the like (e.g. a door or designated entry/exit).

As described in further detail herein, the first virtual zone 112 and/or the second virtual zone 114 are both associated with and defined relative to the machine 110, and represent volumes or areas adjacent to and/or within which contact between the machine 110 and the human 109 is of concern (e.g., an area within which machine and human contact is possible, and/or an area within which an alert can be issued to prevent the human from entering an area within which machine and human contact is possible). For example, the first and second predefined zones 112 and 114 may be respectively defined by one or more virtual volumes having one or more breachable perimeters, so as to respectively define proximities to the machine 110 that may be hazardous or dangerous. In some implementations, for example, the first virtual zone 112 may define and correspond to outer bounds of a warning zone (e.g., within which there may be a moderate risk of collision), and the second virtual zone 114 may define and correspond to outer bounds of a danger zone (e.g., within which there may be a high or higher (relative to warning zone) risk of collision). For example, the personnel safety system 105 may be configured to, upon a breach of the first virtual zone 112 and/or the second virtual zone 114, perform a remedial action such as issuing an alert, and further, upon a breach of the second virtual zone 114, perform a remedial action such as slowing down, shutting off, and/or stopping an operation of the machine 110, or the like. The personnel safety system 105 may execute and perform the remedial action by way of a remediation device, as described in further detail herein.

The first and second virtual zones 112 and 114 can be defined in any suitable manner that promotes safety within the hazardous environment 100. Further, and as described in further detail herein, the first and second virtual zones 112 and 114 can be dynamic, i.e., the zones can change or otherwise be modified at any suitable time based on various criteria (e.g., a particular person or class of persons, an operational mode such as a maintenance or emergency situation, as well as others), as described in further detail herein. As shown in FIG. 1, for example, the first and second virtual zones 112 and 114 are defined with respect to the machine 110 so as to encompass the machine 110. In other embodiments, for example, the first and/or second virtual zones 112 and 114 may be defined so as to not encompass a portion and/or component of the machine 110 (e.g., a valve), such as during a maintenance operation, to facilitate associated maintenance of and operations on the machine 110 (e.g., by facilitating repair or replacement of the valve).

In some implementations, for example, the first and second virtual zones 112 and 114 may be defined as a function of one or more motion and machine characteristics of the machine 110. The motion characteristics may include, for example, position, velocity, and/or acceleration of the machine 110, and/or any other spatially and/or temporally defining characteristic of the machine 110, as described herein. The machine characteristics may include, for example, type, shape (e.g., dimensions), size (e.g., volume), application, and/or any other characteristic of the machine 110, as described in further detail herein. For example, in some implementations, the first and/or second virtual zones 112 and 114 may be defined (e.g., by a user or machine) so as to vary in shape and/or size based on a velocity and/or acceleration of the machine 110, such as to increase in size (e.g., volume) or vary in shape with respect to a position and/or direction of motion of the machine 110 (e.g., by increasing in size with increasing velocity and/or acceleration of the machine 110, etc.). In some implementations, the first and/or second virtual zones 112 and 114 may be defined with respect to a shape and/or size (e.g., volume) of the machine 110, such as to completely or otherwise encompass the machine 110 based on dimensions of the machine 110. In some implementations, the first and/or second virtual zones 112 and 114 may be defined as a function of one or more environmental conditions (e.g., in hazardous environment 100), such as to increase in size in reduced-visibility conditions (e.g., caused by severe weather, an event in the environment such as an explosion, a release of gas from a wellbore such as in drilling the wellbore, etc.) in the environment, and the like.

In some implementations, the first and/or second virtual zones 112 and 114 may be defined so as to dynamically (i.e., in real time) vary in characteristics (e.g., shape, size, etc.), for example, such as by increasing in size with increasing velocity of a machine (e.g., machine 110), changing in shape with changes in acceleration of the machine, and so on. In some implementations, the first and/or second virtual zones 112 and 114 may be defined as a function of an operation or application of the machine 110. For example, for dangerous operations the first and/or second virtual zones 112 and 114 may be configured to increase in size, accordingly. In some implementations, the first and/or second virtual zones 112 and 114 may be defined with respect to and/or include one or more designated virtual safe zones (not depicted), such that a breach by the one or more safe zones does not cause an alert or other remedial action to occur. For example, a safe zone may include an observation post or a safe house located in hazardous environment 100. As another example, a safe zone may include an access pathway from an area outside of or external to the first and/or second virtual zones 112 and 114, through the first and/or second virtual zones 112 and 114, and extending to the machine 110. In this manner, for example, the human 109 can follow along a particular access pathway (within the virtual safe zone) without exercising a breach (results in a remedial action) of the first and/or second virtual zones 112 and 114.

In some implementations, for example, the first virtual zone 112 may define and be representative of outer bounds of a warning zone (e.g., within which there may be a moderate risk of collision), and the second virtual zone 114 may define and be representative of outer bounds of a danger zone (e.g., within which there may be a high or higher (relative to warning zone) risk of collision). The personnel safety system 105 may, for example, be configured to, upon a breach of the first virtual zone 112, perform a remedial action such as issuing an alert, and further, upon a breach of the second virtual zone 114, perform a remedial action such as slowing down, shutting off, and/or stopping an operation of the machine 110, or the like.

In some implementations, the personnel safety system 105 can optionally include a zone within which personnel (or certain personnel in particular, e.g., personnel not authorized to enter a particular zone) should not enter, regardless of the location or status of a movable machine (this zone is referred to herein as a "no-go zone", and shown in FIG. 1 as no-go zone 111). The no-go zone 111 can be functionally and/or structurally similar to virtual zones 112 and/or 114, except that the no-go zone 111 represents an area within the hazardous environment and that is independent from the movable machine. The no-go zone 111 may be defined by one or more virtual volumes having one or more breachable perimeters corresponding to the volumes or areas of concern. In some implementations, the no-go zone 111 may be associated with other zones, such as, for example, a warning zone (not shown, and similar in purpose to the first virtual zone 112), a danger zone (not shown, and similar in purpose to the second virtual zone 114) and/or the like. In such implementations, for example, a remedial action (e.g., one or more alerts) can be issued in response to a person (or unauthorized person) breaching the warning zone, the danger zone, and/or the no-go zone 111 itself, to prevent undesirable consequences of a no-go zone 111 breach.

The machine 110 may include one or more machines in motion, as previously described. For example, the machine 110 may include any type of tool automation used in industry to facilitate an operation (e.g., oil drilling operation). In some implementations, for example, the machine 110 may be characterized by one or more motion characteristics and one or more machine characteristics. For example, the machine 110 may be characterized in terms of type, shape, size, application, and/or any other characteristic suitable for enabling and supporting proximity-based safety of personnel with respect to motions of the one or more machines in the environment. In some implementations, for example, the machine 110 may include any suitable type of machine sensor, and/or the like, as described herein. The machine sensor can be configured to be integrated into the machines in motion for monitoring the status, operation, location, speed, and other movement information associated with the machines in motion, and for use in the control of the machines in motion with respect to the individual personnel. For example, the machine sensor can include a device such as an identification device (e.g., radio-frequency identification (RFID)), a positioning device (e.g., wireless positioning device, GPS device, ultra wide band technology, Bluetooth® technology, etc.)), and/or the like. In some implementations, the machine sensor can be or include a wireless positioning device configured for communications at any suitable frequency, range, or band, such as, for example, 900 MHz, 2.4 GHz, 5 GHz, 6 GHz, 10 GHz, or the like, including any values therebetween.

The virtual defining boundary 107 may include, for example, a geo-fence, or the like. As described in further detail herein, the virtual defining boundary 107 may be defined relative to the defining boundary 101, and may represent one or more outer bounds of the shared space of concern, to which the personnel safety system 105 may be applied with respect to the machine 110 and the human 109. For example, the virtual defining boundary 107 may be defined, relative to the defining boundary 101, by one or more virtual volumes having one or more breachable perimeters or boundaries, so as to establish the boundaries of the shared space of concern for active monitoring and application of the personnel safety system 105. In some implementations, for example, the defining boundary 107 may include or be implemented by way of a geofence. In some implementations, for example, the defining boundary 107 may define and correspond to bounds of an active work zone, within which only authorized personnel may be permitted. As an example, the personnel safety system 105 may be configured to, upon a breach of the defining boundary 107 by unauthorized personnel, perform a remedial action such as issuing an alert, as described in further detail herein. In some implementations, the personnel safety system 105 may execute and perform the remedial action by way of a remediation device, as described in further detail herein. In some implementations, the virtual defining boundary 107 may be defined (e.g. by a user) so as to vary in shape, size, or any other attribute, based on the particular operation performed by, or an operational mode of the machine 110 in the hazardous environment 100. For example, the virtual defining boundary 107 may be defined so as to increase or decrease in shape (e.g. volume) based on a level of risk or danger in performing any particular operation.

The human 109 may include one or more personnel, as previously described. For example, the human 109 may include a person that, in concurrently occupying the hazardous environment 100 with the machine 110, may be subject to danger, such as by exposure to risk of collision with the machine 110. A level of awareness of the human 109, such as with respect to one or more machines in motion (e.g. machine 110) in the hazardous environment 100, may be subject to variation such as based on the task at hand, environmental conditions, and the like. Accordingly, the human 109 may be at-risk of collision with one or more of the machines in motion in the hazardous environment 100. In some implementations, for example, the human 109 may be at-risk of a collision to an extent corresponding to a level of authorization of the human 109. For example, authorized personnel (e.g. human 109) in an environment (e.g. hazardous environment 100) may be subject to a lower risk of collision compared to unauthorized personnel in the environment.

In use, as described with reference to FIG. 1, the personnel safety system 105 may be implemented in various types of hazardous environments, such as in or on oil rigs, drill floors, oil rig floors, radioactive, contaminated, bio-hazardous environments, and/or any other type of environment in which personnel may be exposed to risk of collision or impact with one or more machines in motion.

For example, the personnel safety system 105 may be configured to dynamically determine a position, velocity, and/or acceleration (for simplicity, collectively referred to herein as "motion") of machine 110. In some implementations, the personnel safety system 105 is configured to implement one or more positioning or locating techniques, including, for example, imaging, computer-vision, image analytics, ranging, and/or the like, as described in further detail herein. Further, the personnel safety system 105 may, in some cases, dynamically determine motion of human 109 by implementing various positioning techniques and/or identification techniques, such as automatic identification and data capture (AIDC), and the like.

In some embodiments, existing or native monitoring or sensing systems can be used to determine motion of machine 110. Existing systems can include machine-to-machine communication systems, including, for example, OPC Unified Architecture (OPC UA), which is a machine to machine communication protocol. Accordingly, for example, data captured in connection with such communication protocol can be used to determine location and/or motion of machine 110 for purposes of comparing that motion to human 109 to determine whether or not any remedial action is required to prevent a collision, as described in further detail herein. The location and/or motion information from such systems, in some instances, can be analyzed in connection with additional sensors, e.g., machine sensor 237, as introduced below) to compare with a position of the human to determine whether or not any remedial action should transpire.

As described in further detail herein, in some cases, for example, the personnel safety system 105 may dynamically associate one or more zones (e.g., first and second virtual zones 112 and 114) with the machine 110 to, and in response to detecting a breach of one or more of the zones, cause the personnel safety system 105 to perform one or more remedial actions, as described in further detail herein. The zones, for example, can be continually or periodically redefined (changed in size, shape, or location within the hazardous environment 100) based on motion of the machine 110. Subsequent to the dynamic determinations of the respective motions, the personnel safety system 105 may perform a remedial action to support the proximity-based safety of the personnel with respect to motion of the machine 110, such as by issuing an alert to those personnel at-risk of collision, controlling a motion of the machine (e.g., stopping the machine, slowing the machine, changing a direction of movement of the machine, etc.) so as to avoid collision with personnel, and the like. Further, the personnel safety system 105 may determine whether personnel are authorized to be present in the hazardous environments, and, where unauthorized personnel are determined to be present, subsequently perform a remedial action such as issuing an alert to the unauthorized personnel and/or other parties of interest, as described in further detail herein.

Figure 2:
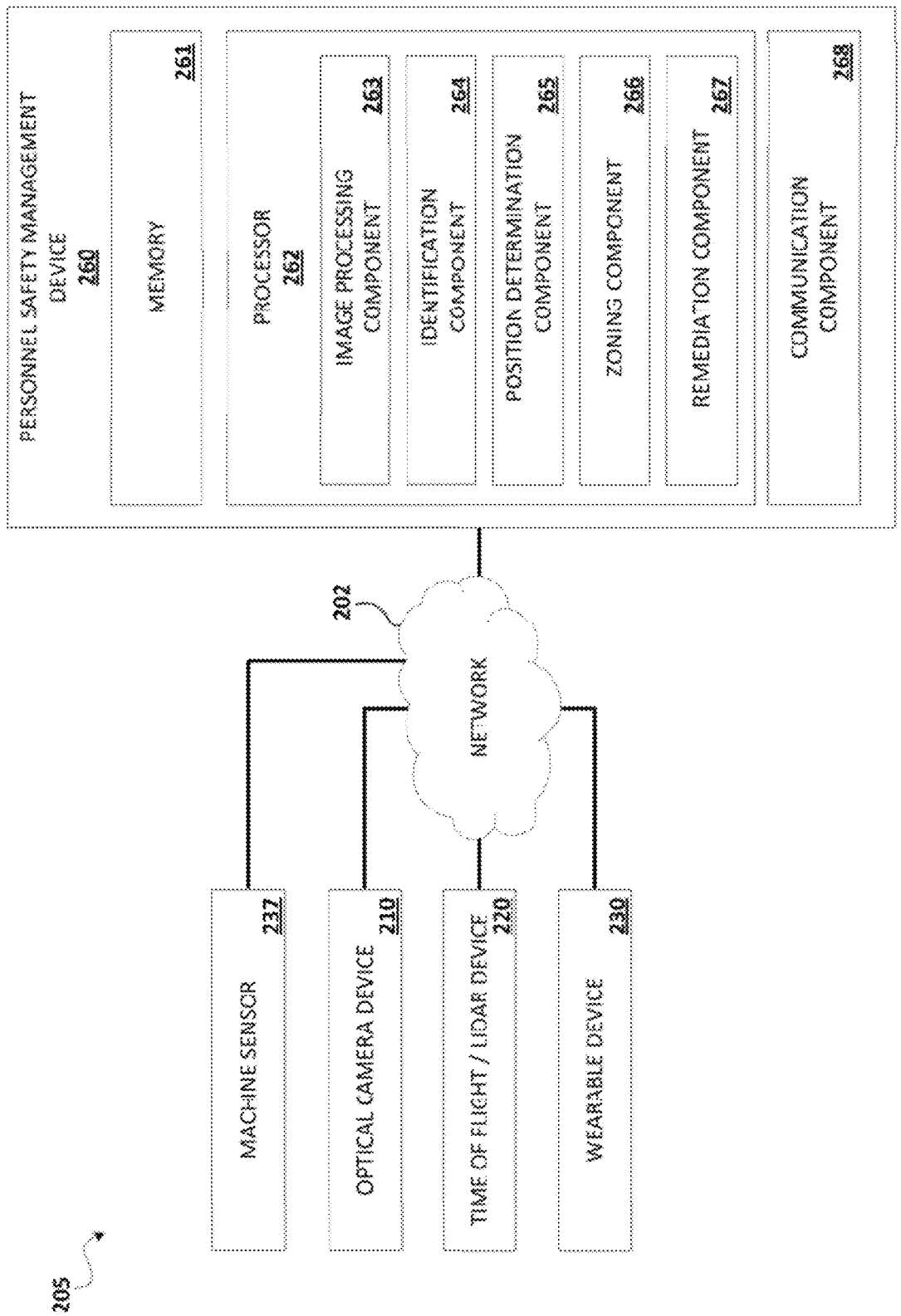
FIG. 2 is a functional block diagram depicting an example of a personnel safety system, in accordance with an embodiment.

FIG. 2 is a functional block diagram depicting an example of a personnel safety system 205, in accordance with an embodiment. The personnel safety system 205 can be the same as or similar to, and can function the same as or similar to the personnel safety system 105. In this embodiment, the personnel safety system 205 includes a machine sensor, an optical camera device 210, a TOF or LIDAR device 220, and a wearable device 230, all of which are interconnected over a network 202 to a personnel safety management device 260. In some embodiments, the personnel safety system 205 can optionally include a database device (not shown), which can be interconnected to or otherwise operable in conjunction with the personnel safety management device 260, (e.g., via communications over network 202, and/or via communications over a pathway distinct from the network 202) While FIG. 2 depicts the personnel safety system 205 as including are certain number of discrete devices, other arrangements may be contemplated. For example, the personnel safety system 205 may include one or more instances of the machine sensor 237, the optical camera device 210, the TOF or LIDAR device 220, the wearable device 230, and/or the personnel safety device 260 that may be individually formed by one or more integrated or distinct devices. Further, in some embodiments, a personnel safety system can include and utilize data generated by both a TOF device and a LIDAR device.

The personnel safety system 205 may be implemented in or with respect to a hazardous environment (e.g., hazardous environment 100), as such may be, for example, concurrently occupied by one or more personnel (e.g., human 109) and one or more machines in motion (e.g., machine 110).

In various implementations, the network 202 may include, for example, an intranet, a local area network (LAN), a personal area network (PAN), a wireless local area network (WLAN), a wireless personal area network (WPAN), a wireless mesh network, a wide area network (WAN) such as the Internet, or the like. The network 202 may include wired, wireless, or fiber optic connections. Generally, network 202 may include any combination of connections and protocols for supporting communications between the machine sensor 237, the optical camera device 210, the TOF or LIDAR device 220, the wearable device 230, and the personnel safety management device 260, in accordance with the present disclosure.

In various implementations, the machine sensor 237, the optical camera device 210, the TOF or LIDAR device 220, the wearable device 230, and/or the personnel safety management device 260, may include a computing platform or node such as a mobile or smart phone, a tablet computer, a laptop computer, a desktop computer, a server, a virtual machine, a wearable device, an implantable device, or the like. In the various implementations, machine sensor 237, the optical camera device 210, the TOF or LIDAR device 220, the wearable device 230, and/or the personnel safety device 260 may otherwise include any other type of computing platform, computer system, or information system capable of sending and receiving data to and from another device, such as by way of the network 202.

In some implementations, the machine sensor 237, the optical camera device 210, the TOF or LIDAR device 220, the wearable device 230, and/or the personnel safety device 260 may include internal and external hardware components, such as described with reference to FIG. 11. In other implementations, the machine sensor 237, the optical camera device 210, the TOF or LIDAR device 220, the wearable device 230, and/or the personnel safety device 260 may be implemented in or by way of a cloud computing environment, such as described with reference to FIGS. 12 and 13.

In some implementations, for example, the optical camera device 210 (or "OC") may include, for example, a complimentary metal-oxide-semiconductor (CMOS) sensor such as a camera, a video recorder, an infrared camera, or any other suitable image sensor, image capture device, photodetector, or the like, in accordance with the present disclosure. In some implementations, for example, the optical camera device 210 may be disposed in or with respect to a hazardous environment (e.g., hazardous environment 100), to capture images of the hazardous environment (e.g. a drill rig floor, etc.) with respect to one or more machines in motion (e.g. machine 110) so as to enable and support proximity-based personnel safety with respect to the motions of the machines. In some implementations, for example, a captured image may include image data corresponding to a two-dimensional (2D) image, a three-dimensional (3D) image, and the like. The optical camera device 210 may be implemented to capture the images of the hazardous environment with respect to one or more machines in motion in the environment, and further, one or more personnel in the environment. The captured image may include any suitable type of image to which digital image processing and/or machine learning can be applied. Image processing, for example, can include one or more of image analytics, facial-recognition, object-recognition, identity recognition, etc.)

In some implementations, the machine learning may implement or otherwise include, for example, a neural network such as a convolutional neural network (CNN). As an example, such a CNN may be applied to a captured image to, upon image processing thereof, extract or otherwise recover a 3D reconstruction of a hazardous environment (e.g., hazardous environment 100,), to thereby increase accuracy and reliability of determinations of positions, velocities, and/or accelerations of one or more machines in motion with respect to individual personnel in the hazardous environment. In some implementations, the neural network may be trained to recognize personnel (e.g., human 109) in the hazardous environment based on one or more corresponding images captured of the personnel.

The neural network may be trained, for example, by way of supervised learning based on one or more labeled training sets, such as may be stored on memory 261, a database (not shown), and/or other suitable locations accessible by the personnel safety management device 260. Such a training set may include, for example, a variety of images of individual personnel having associated labels, such as corresponding to identity, level of authorization, permissions, and the like. In some implementations, the variety of images may include, for example, labeled images associated with particular personnel having varying levels of visibility or clarity. Accordingly, the supervised training of the CNN may increase the accuracy and reliability of the determinations with respect to the varying levels of visibility or clarity of the images to thereby increase the robustness of the determinations. Advantageously, with the CNN's learning-based recognition of the locations and movements of the personnel and the machines in motion can be respectively determined with a high degree of accuracy and reliability.

In some implementations, the CNN can be trained to determine or estimate the location of the human (e.g., human 109) with respect to the machine (e.g., machine 110) in the hazardous environment (e.g., hazardous environment 100) based on the images captured by the optical camera device 210. The optical camera device 210, for example, may be disposed in or about the hazardous environment to capture the images. Accordingly, the accuracy and reliability of determinations as to the location of the human may be increased. In some implementations, for example, the CNN can be trained to determine a likelihood of a particular trajectory of the machine throughout the hazardous environment based on the captured images. For example, the CNN may be applied to image data corresponding to the captured images for use in conjunction with a computer vision technique.

In various implementations, the TOF or LIDAR device 220 may include, for example, a scannerless device that can illuminate an entire scene of interest (e.g., a region of the hazardous environment 100) with light emitted from a laser source in the TOF or LIDAR device 220, and then receive the reflected light for processing to determine and/or estimate locations and/or movements of one or more machines in motion. In some implementations, the TOF or LIDAR device 220 receives and measures reflections of its own emitted light; as such, the TOF or LIDAR device 220 is at least substantially immune to effects of external light sources such as ambient light. Based on the reflected light, and in particular based on phase and/or travel time information in the reflected light when compared to the transmitted light, in some implementations, the TOF or LIDAR device 220 can extract a three-dimensional ("3D") point cloud of the scene of interest, which allows for the at least substantially accurate determination and/or estimation of each of the positions of the one or more machines in motion, and/or each of the personnel in the hazardous environment. Accordingly, the TOF or LIDAR device 220 may be implemented to enable and support accurate determination of the positions of the one or more machines in motion, and each of the personnel in the hazardous environment.

In various implementations, the TOF or LIDAR device 220 can be used to scan the hazardous environment, and in particular, can be used to scan each machine in motion and each personnel with pulsed light waves and receive the reflected pulses which allow for greater accuracy and reliability of location and position determinations (e.g., a 1D point cloud of the objects illuminated with the pulsed light waves, a one-dimensional ("1D") point cloud being a collection of points representing the 1D coordinates of the objects (and hence outlining shapes or features of the objects)). For example, the pulsed light waves 130a may be a laser, including laser having wavelength in the range from about 500 nm to about 1600 nm, wavelengths of about 532 nm, about 905 nm, about 1064 nm, about 1550 nm, etc., including values and subranges therebetween.

In some implementations, the TOF or LIDAR device 220 can scan the hazardous environment in any direction, so as to scan around and/or beyond objects (e.g., such as the door 103) in which case the LIDAR will receive and/or sense waves reflected from the door 103, or any other surface of the environment).

As an example, the time period between the LIDAR's light transmission and receipt of one or more waves reflected from a first object (e.g., the machine 110, the human 109, etc.) will be different from the time period between the LIDAR's light transmission and receipt of one or more waves reflected from an object other than the first object. This difference in time can be used to determine individual positions of each object in the environment. In this example, for instance, an arrival time for a reflection from a first transmitted wave that is greater than an arrival time for a reflection from a second transmitted wave as the LIDAR scans upward may indicate that the first object is oriented towards the LIDAR. Accordingly, an analysis of the 1D point cloud can provide higher accuracy in determining a position of the first object.

In some implementations, positions, velocities, and/or accelerations of one or more machines in motion and/or one or more personnel in the hazardous environment may be determined by analysis of data generated by the optical camera device 210 and/or the TOF or LIDAR device 220. Accordingly, data from multiple sources can be compared to improve reliability of the determinations, such as by comparison of the determined positions (e.g., coordinates) by the optical camera device 210 and the TOF or LIDAR device 220.

In some implementations, the wearable device 230 may include, for example, a wearable sensor and/or transceiver device. In some implementations, the wearable device 230 may be configured to issue a visual, audible, and/or tactile stimulus, or otherwise provide an alert that is perceivable by personnel (e.g., human 109). For example, the wearable device 230 may be configured to issue an alert to the human 109 by way of a transducer and/or actuator.

In some implementations, the wearable device 230 may include at least two alerting modalities (e.g. visual and audible, audible and tactile, tactile and visual, etc.) by which to issue alerts. Alternatively, in some embodiments, the wearable device 230 may include at least three alerting modalities (e.g. visual, audible, and tactile) by which to issue the alerts. Issuance of the alert by way of at least two alerting modalities may provide redundancy and increase reliability, and further, may increase the effectiveness of communicated alerts to personnel in hazardous environments, such as in harsh environmental conditions or during performance of an industrial operation, when one of the alerting modalities may not be perceived due to the conditions, or otherwise, by which personnel may be less susceptible to perceiving any particular modality.

In addition to issuing alerts, the wearable device 230 can be configured for personnel identification, authorization, and/or position tracking. For example, the wearable device 230 may include, a short-range communication device, a medium-range communication device, an RFID device, a positioning device (e.g., wireless positioning device, GPS device, ultra wide band technology, Bluetooth® technology, etc.), and/or the like, that can provide data or coordinates of the wearable device 230 within the hazardous environment, which can then be used for locating and tracking of the personnel wearing the wearable device 230. As described in further detail herein, position data generated by the wearable device 230 can be compared with position data generated by other sensors, such as the TOF and/or LIDAR sensor 220, to identify a match between the position data coming from each source. Such a match can provide a sufficient level of confidence that the position data from each source is accurate.

The wearable device 230 is configured to be worn by personnel (e.g., human 109), such as by attachment to safety or protective clothing, apparel, or gear ("safety gear"). For example, the safety gear may include a hardhat, a reflective vest, a hazardous materials (HAZMAT) suit or garment, or any other protective piece of cloth, fabric, or material, in accordance with the present disclosure. The wearable device 230 may be attached to or otherwise integral with the safety gear, such as by a connecting and/or locking mechanism (e.g., a double locking mechanism), adhesive, magnetic force, and/or the like. In general, the safety gear may include any garment, apparel, or wearable material suitable for use in hazardous environments and under hazardous or dangerous conditions. In some cases, the safety gear worn by personnel may reduce a level of awareness (e.g., mobility, vision, hearing, etc.). Accordingly, in some implementations, at least two alerting modalities may be used to provide redundancy and increase reliability, and further, may increase the effectiveness of communicated alerts to personnel encumbered by awareness-reducing safety gear. Issuing an audible alert with a visual alert, for example, may increase the chances that the personnel properly and timely perceives at least one of the alerts.

In some implementations, the machine sensor 237 may include any suitable type of sensor or transducer, or transceiver device, receiver device, transmitter device, and/or the like. The machine sensor 237 is configured to generate data corresponding to position and/or motion the machine to which it is operably coupled, e.g., for use in predicting and preventing collisions between the machine and personnel, as described in further detail herein. The data generated by the machine sensor 237, for example, can be representative of a position of the machine to which the machine sensor 237 is operably coupled within the hazardous environment, and that position can be used to define virtual zones (as described in further detail herein), and to compare with position and/or tracking data associated with personnel, to identify a potential collision. The machine sensor 237 can be operably coupled to the machine in any suitable manner.

In some implementations, the machine sensor 237 may be configured to issue an alert. For example, the machine sensor 237 may include a transducer, actuator, and/or any other suitable component capable of issuing an alert (e.g., an audible and/or visual alert) that is perceivable by personnel at or near the machine to which the machine sensor 237 is operably coupled. In some implementations, the machine sensor 237 may include at least two alerting modalities (e.g. visual and audible, audible and tactile, tactile and visual, etc.) by which to issue alerts. In the various embodiments, the machine sensor may alternatively include at least three alerting modalities (e.g. visual, audible, and tactile) by which to issue the alerts, similar to as described herein with reference to the wearable device 230. In some implementations, the machine sensor 237 includes a short or medium range communication device, an RFID device, a positioning device (e.g., wireless positioning device, GPS device, ultra wide band technology, Bluetooth® technology, etc.), and/or the like, to enable machine identification, position, and/or motion tracking.

In some implementations, the personnel safety system 205 can be configured to obtain position and/or motion data associated with a machine (e.g., machine 110) from sources other than the machine sensor 237. Such sources can include, for example, native or existing monitoring or sensing systems associated with machine, including machine-to-machine communication systems (e.g., OPC Unified Architecture (OPC UA). In some implementations, data from the machine sensor and data from the other sources (such as OPC UA) can be compared for to verify and provide assurance that the data from each source is accurate. In other implementations, the data from such sources other than the machine sensor 237 may be sufficient (i.e., without the machine sensor 237 data) to sufficiently identify the position and/or motion of the machine.

As shown in FIG. 2, the personnel safety management device 260 includes or hosts a memory 261, a processor 262, and a communication component 268. The personnel safety management device 260 may include an application or program such as a web or Internet-based application, a software program, one or more subroutines contained in a program, an application programming interface, or the like. The personnel safety management device 260 may implement a combination of devices and technologies such as network devices and device drivers to support the operation of the memory 261, processor 262, and communication component 268, and provide a platform enabling communications between the machine sensor 237, the optical camera device 210, the TOF or LIDAR device 220, the wearable device 230, and the personnel safety management device 260. The personnel safety management device 260 can be configured to concurrently monitor activities of machines (e.g., machine 110) with respect to personnel (e.g., human 110) in a hazardous environments (e.g., hazardous environment 100).

In various implementations, the personnel safety management device 260 may implement one or more of the machine sensor 237, optical camera device 210, the TOF or LIDAR device 220, and/or the wearable device 230, to, for example, generate data for subsequent communication with processor 262. In the various implementations, the generated data may be communicated for processing to the personnel safety management device 260 to determine a position, location, and/or motion information associated with personnel (e.g., human 109) and one or more machines (e.g., machine 110) in a hazardous environment (e.g., hazardous environment 100).

The memory 261 may include a computer readable storage medium, as described in further detail herein. As shown in FIG. 2, the processor 262 includes or hosts an image processing component 263, an identification component 264, a position determination component 265, a zoning component 266, and a remediation component 267. The image processing component 263 may be implemented to perform image processing or analytics, as described herein. The identification component 264 may be implemented to identify individual personnel (e.g., human 109) in a hazardous environment (e.g., hazardous environment 100), as described herein. The position determination component 265 may be implemented to determine positions of one or more machines in motion, and personnel concurrently situated in a hazardous environment, as described herein. The zoning component 266 may be implemented to define the virtual zones (e.g., virtual zones 107, 111, 112, 114), and assign, and/or associate one or more of the virtual zones with one or more machines (e.g., machine 110), as described in further detail herein. The remediation component 267 is configured to issues alerts, perform remedial actions, or otherwise cause remedial actions to be performed. The remediation component 267, for example, can trigger alerts at the wearable device 230 and/or the machine sensor 227, as described in further detail herein. The communication component 268 is configured to send and receive data, to and from each of the memory 261, the processor 262, and (via the network 202) the machine sensor 237, the optical camera device 210, the TOF or LIDAR device 220, the wearable device 230.

In some implementations, the zoning component 266 can be configured to receive input such as user input including instructions to define or vary parameters of any of the virtual zones (e.g., virtual zones 112, 114, and/or 111). For example, the input can include user input corresponding to instructions for defining or redefining the shape, size (e.g., volume, perimeter, etc.), application or functionality (e.g., warning zone, danger zone, safe zone, machine-proximity zone, etc.), of the virtual zones. With reference to the first virtual zone 112, for example, the zoning component 266 can be configured (e.g., by an operator) to redefine one or more parameters of the first virtual zone 112 to change its functionality from that of a warning zone to that of a danger zone. As another example, the zoning component 266 can be configured to define the first virtual zone 112 and/or the second virtual zone 114 as a function of one or more of the motion characteristics and/or one or more machine characteristics, as previously described. In some implementations, for example, the first and/or second virtual zones 112 and 114 may be configured as a function of a role or seniority of the personnel such that the first and/or second virtual zones 112, 114 can be defined in a first manner for a first job type or person and in a second manner (e.g., having a different size and/or shape, etc.) for a second job type or person. In this manner, it can be ensured that the proper personnel are able to access the appropriate equipment, whereas other personnel are not.

In some implementations, the remediation component 267 can be configured to perform a remedial action based on any of the parameters defined at zoning component 266 and/or otherwise associated with any of the monitored equipment, personnel, zones, etc.). For example, the remediation component 267 can be configured to perform a remedial action in response to detecting or determining an overlap or imminent overlap in the location or motion of personnel such as the human 109, and that of the machine 110 or the first and/or second virtual zones 112 and 114, as described herein.

In some instances, the remediation component 267 can be configured to perform remedial actions such as generating an alert corresponding to a danger or a risk of collision with a machine in motion. That is, the remedial action may include generating the alert based on the extent or magnitude of the associated danger or risk of collision with the machine in motion and can be tailored to such level of danger, accordingly. For example, in some instances, the remedial action may be a slight haptic vibration when a position of personnel poses a small degree of risk of collision to the personnel. As another example, in other instances, the remedial action may be or include any suitable stimuli, such as combination of sirens, lights, etc., such as when risk of a collision between the personnel and the machine 110 is imminent.

In some implementations, the remediation component 267 can be configured to generate and send remediation data corresponding to an alert to be issued, a tool or machine control command or instruction to be executed to control machine operations including controlling or stopping motion or operations of the machine 110, and the like. In some implementations the remediation data can be sent to the wearable device 230 for issuance of the alert thereat. For example, in such instances, the remediation component 267 can be configured to send a signal to the wearable device 230 (e.g., via the communication component 268) to cause the wearable device 230 to issue the alert. In some implementations, the alert can be or include, for example, at least one of a visual alert, an audible alert, and/or a haptic alert. For example, the visual alert can include flashing lights, the audible alert can include an audible tone, and the haptic alert can include a vibration or force-feedback. In some implementations, the alert can be or include at least two of a visual alert, an audible alert, and/or a haptic alert. In some implementations, the alert can be or include all three of a visual alert, and audible alert, and a haptic alert.

In some implementations, the remediation component 267 can be configured to issue alerts such as in the form of a visual alert and an audible alert to personnel (e.g., to human 109) based on the location of the personnel in the hazardous environment 100, and a location of any of the zones described herein (e.g., virtual zone 112, virtual zone 114). For example, the remediation component 267 can be configured to issue an alert upon in response to detecting a breach of the first zone 112 by the human 109, as shown in FIG. 1. As another example, the remediation component 267 can be configured to control or stop motion or an operation of the machine 110 upon in response to detecting a breach of the second zone 114 by the human 109, as shown in FIG. 1, and/or issue an alert.

Although shown and described as TOF or LIDAR device 220, in some embodiments, a personnel safety system may include one or more TOF devices, and/or one or more LIDAR devices. In embodiments having both a TOF device and a LIDAR device, the personnel safety system can use data generated by the TOF device and data generated by the LIDAR device to perform the various safety actions described herein. In some implementations, for example, the data generated by the TOF device can be compared to the data generated by the LIDAR device to identify a match between the data, thereby providing redundancy to operation.

In use, for example, the TOF or LIDAR device 220 can capture or generate position data representative of a position of a human within a hazardous environment, and send the position data via the network 202 to the personnel safety management device 260. Further, the wearable sensor 230 being worn by the human can capture or generate position data representative of the human within the hazardous environment, and send the position data via the network 202 to the personnel safety management device 260. The personnel safety management device 260 (or the position determination component 265 of the personnel safety management device 260) can then compare the position data from the TOF or LIDAR device 220 to the position data from the wearable sensor 230 to identify a match, thereby providing a sufficient degree of confidence that the position of the human has been accurately identified.

Further, the machine sensor 237 operably coupled to a machine (e.g., in proximity to the human) can capture or generate position data representative of the machine within the hazardous environment, and send via the network 202 the position data to the personnel safety management device 260. The personnel safety management device 260 can then compare the position data from the machine sensor with the data from the TOF or LIDAR device 220 and/or the data from the wearable device 230 to determine a distance between the human and the machine. In some instances, if for example the distance meets a predetermined threshold, and/or it is determined that the human has crossed into a particular virtual zone (e.g., associated with the machine), the personnel safety management device 260 (or the remediation component 267) can send a signal to the wearable device 230 such that the wearable device 230 issues one or more alerts. Additionally, or alternatively, the personnel safety management device 260 can send a signal to the machine to stop or alter the machine's movement or operation. In some embodiments, the personnel safety management device 260 can compare the position data from the machine sensor with the data from the wearable device 230 (and not the position data from the TOF or LIDAR device 220) to determine whether or not an alert or signal to stop or alter a machine should be issued. In this manner, the TOF or LIDAR device 220 is used simply to confirm the accuracy of the position data generated by the wearable sensor 237, after which the effectively verified wearable sensor 237 can be used in conjunction with the data captured or generated by the machine sensor 237 to determine if and when remediation measures should be taken.

In some embodiments, in addition to the previous example, the optical camera device 210 can be used to capture or generate image data associated with the human in the hazardous environment, and send that image data to the personnel safety management device 260 via the network 202. The image processing component 263 of the personnel safety management device 260 can then conduct image analytics on the image data to detect a location of the human (e.g., relative to a machine or virtual zone such as a warning or danger zone), and/or to detect or identify an identity of the human (e.g., to determine with the human is authorized to be in that zone).

As an example implementation of the personnel safety system 205, in some instances, the TOF/LIDAR device 220 can capture position data representative of a positon of a human within the hazardous environment, and send that position data via the network 202 to the personnel safety management device 260. The personnel safety management device 260 can then compare the position data received from the TOF/LIDAR device 220 with a position data captured by a plurality of wearable devices 230 (e.g., in some instances, only the wearable devices that are indicated as being active at that time within the hazardous environment) to detect whether or not the position of the human identified by the TOF/LIDAR device 220 matches any of the positions of the wearable devices 230. A match can indicate that the human identified by the TOF/LIDAR device 220 is authorized to be in the hazardous environment and/or at that identified position. A lack of a match can indicate that the human identified by the TOF/LIDAR device 220 is not authorized to be in the hazardous environment, e.g., perhaps the human is not wearing a wearable device, which is why no match could be identified.

In some instances, the personnel safety management device 260 can compare the position data received from the TOF/LIDAR device 220 with position data captured by only the wearable devices 230 that are authorized to be in the zone or position identified by the TOF/LIDAR device 220. In this manner, a failure to match indicate that the human is not wearing a wearable device, or is wearing a wearable device but is not authorized to be in that particular location, position, zone, etc. If it is identified that the human is not authorized to be in the position identified by the TOF/LIDAR device 220, the personnel safety management device 260 can send a signal to one or more alert devices associated with the hazardous environment such that the alert device issues an alert. The one or more alert devices could include, for example, an alert device common to the hazardous environment, an alert device attached and/or assigned to the wearable device 230, an alert device attached and/or assigned to a human associated with the wearable device 230, an alert device associated with an operator (e.g., an operator of a drill rig floor), and/or the like.

In some instances, the machine sensor 237 can capture and send motion and/or position data of the movable machine to which it is attached to the personnel safety management device 260 via the network. If, as discussed immediately above, the human is determined to be authorized, the personnel safety management device 260 can compare the position data captured by the wearable device 230 with the position data captured by the machine sensor 237 to identify a relationship therebetween. As an example, the comparison could result in identifying a distance between the human and the machine. As another example, the comparison could result in identifying a trajectory of each the human and/or the machine, and thereby identify an expected location or time of collision. The relationship could be compared to a predefined threshold, such as, for example, an unsafe distance between human and machine, an unsafe trajectory of the human relative to a trajectory of the machine, an unsafe time period before the human and/or machine could collide, etc., and if the relationship meets such a predefined threshold, the personnel safety management device 260 can send a signal to an alert device (e.g., an alert device being worn by the human) such that the alert device issues an alert.

In some instances, e.g., before capturing, sending, and/or analyzing the position data captured by the TOF/LIDAR device 220, the optical camera device 210 can capture an image of the hazardous environment, and send that image to the personnel safety management device 260. The personnel safety management device 260 can then conduct image analytics on the image to identify the human within the hazardous environment (in other embodiments, the image analytics could be conducted elsewhere, e.g., at the optical camera device 210 or at a remote server). In some instances, detection of the human by the image analytics can trigger capturing of the position data representative of the position of the human by the TOF/LIDAR device 220 and/or analysis of the position data representative of the position of the human.

In some instances, the personnel safety management device 260 can compare position data captured and provided by the wearable device 230 with a predefined zone (e.g., a safe zone, a no-go zone, a watch zone, a warning zone, etc.) within the hazardous environment, and if a particular zone is breached (e.g., the position data falls within the predefined zone), the personnel safety management device 260 can send a signal to an alert device (e.g., an alert device attachable to or being worn by the human). The personnel safety management device 260 can continually, periodically, etc. receive additional position data from the wearable device 230, and compare that additional position data to the predefined zone, and if, for example, the additional position data does not fall within the predefined zone, the personnel safety management device 260 can send a signal to the alert device such that the alert device stops issues the alert.

In some instances, as described in further detail herein, multiple predefined zones may exist, and alerts can vary among such predefined zones. If, for example, a first predefined zone (e.g., an outer boundary) and a second predefined (e.g., an inner boundary) are assigned to a hazardous environment, and it is detected that the position data captured by the wearable device 230 falls within the first predefined zone, but not the second predefined zone, a first alert can be issued (e.g., an alert can be issued by an alert device worn by the human). Further, for example, if it is detected that the position data captured by the wearable device 230 falls within the second predefined zone, a second alert (or multiple second alerts) can be issued (e.g., one or more alerts can be issued by an alert device worn by the human and/or a machine associated with the second predefined zone), one or more alerts can be issued to an operator of the hazardous environment, etc.). Further, in some instances, a signal can be sent such that motion of a machine associated with the second predefined zone can be altered (e.g., slowed, re-routed, stopped, etc.).

Further, in instances in which the first and second predefined zones are associated with and/or defined based on a particular movable machine, in some cases, the first and second predefined zones can be dynamic, as described in further detail herein. In such instances, for example, the zones can be continually (e.g., in real-time), or periodically redefined as the movable machine moves and based on a position, orientation, configuration, velocity, acceleration, status, trajectory, and/or the like of the movable machine. For instance, a movable machine moving at a relatively fast speed may contribute to a relatively large zone, while a movable machine moving at a relatively slow speed may contribute to a relatively smaller zone, as the amount of time required by personnel to move away from a potential collision with the movable machine may decease with increased speed of the movable machine.

As yet a further example, if a potential collision is detected, in addition to sending signals to issue alerts and alter movement of the movable machine involved in the potential collision, the personnel safety management device 260 can identify other movable machines associated to the movable machine involved in the potential collision, and can send signals to one or more of those other movable machines to alter their course, e.g., to prevent operational issues that could occur when one machine in an assembly of machines alters course.

Figure 3:
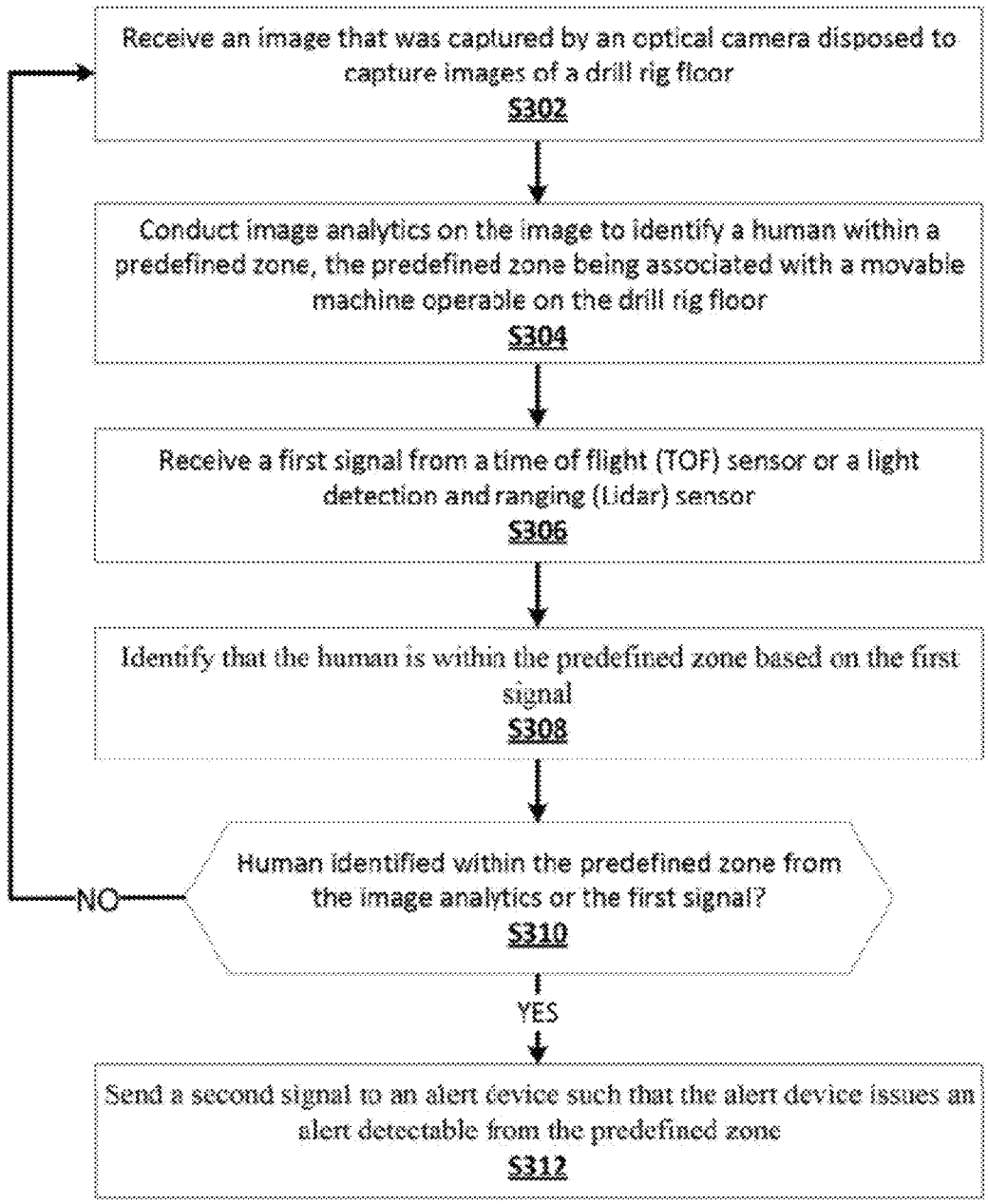
FIG. 3 is a flowchart depicting operational steps of an aspect of a personnel safety system, in accordance with an embodiment.

FIG. 3 is a flowchart depicting operational steps of an aspect of a personnel safety system (e.g., similar to or the same as any of the personnel safety systems disclosed herein), in accordance with an embodiment.

At Step S302, the personnel safety management device 260 may receive, such as by way of the communication component 268, an image from an image capture device or optical camera, such as the optical camera device 210 (e.g. by way of the network 102) as such may be captured by the optical camera device 210 with respect to a hazardous environment such as a drill rig floor.

At Step S304, the personnel safety management device 260 may conduct, such as by way of the image processing component 263 resident on the processor 262, image analytics on the image to identify a human (e.g. human 109) within a virtual zone, where the virtual zone may be associated with a movable machine (e.g. machine 110) operable in the hazardous environment such as on the drill rig floor. As previously described herein, the virtual zone may otherwise include or be associated with one or more virtual or designated safe zones, no-go zones, and/or the like.

At Step S306, the personnel safety management device 260 may receive, such as by way of the communication component 268, a first signal from a TOF sensor or a light detection and ranging (LIDAR) sensor (e.g. TOF or LIDAR device 220).

At Step S308, the personnel safety management device 260 may identify, detect, and/or determine, such as by way of the image processing component 263, the identification component 264, the position determination component 265, and/or the zoning component 266 residing on the processor 262, that the human is within the virtual zone based on the first signal.

At Step S310, the personnel safety management device 260 may determine, such as by way of the image processing component 263 the position determination component 265, and/or the zoning component 266 residing on the processor 262, whether or not the identified human is located within the virtual zone. The determination may be made based on the conducted image analytics on the image, such as at Step S304. Subsequently, if it is determined that the identified human is not located within the virtual zone, the method may proceed back to Step S302. In an embodiment, if it is determined that the identified human is located within the virtual zone, the method may proceed to Step S312. In some implementations, the determination as to whether or not the identified human is located within the virtual zone can include determining an identity of the human based on (e.g., identifying signals and/or data received from) a wearable identifier being worn by the human within the predefined zone.

At Step S312, the personnel safety management device 260 may send, such as by way of the communication component 268, a second signal to an alert device (e.g. wearable device 230) such that the alert device issues an alert detectable from the virtual zone. In an embodiment, the detectable alert may include, for example, a readily perceivable stimulus, such as by personnel (e.g. human 109) in a hazardous environment (e.g. hazardous environment 100), as described herein. In some implementations, the alert is or can be or include, for example, at least two of a visual alert, an audible alert, or a haptic alert.

In some implementations, the image from the optical camera device 210 (e.g., received at S302) is or can be or include a first image. Moreover, the first image and the first signal from the TOF or LIDAR sensor (e.g., received at S306) can be received during a first time period. Further, the second signal can be sent during the first time period.

In some implementations, the personnel safety management device 260 may receive, during a second time period after the first time period, a second image that was captured by the optical camera. In such embodiments, the personnel safety management device 260 may conduct, during the second time period, image analytics on the second image to detect that the human is not located within the predefined zone. Moreover, the personnel safety management device 260 may send a third signal to the alert device such that the alert device stops issuing the alert in response to the detection that the human is not located within the predefined zone.

In some implementations, the personnel safety management device 260 may receive, during the second time period after the first time period, a third signal from the TOF sensor or the LIDAR sensor. In such embodiments, the personnel safety management device 260 may be configured to detect, during the second time period, that the human is not located within the predefined zone. Moreover, the personnel safety management device 260 may send a third signal to the alert device such that the alert device stops issuing the alert in response to the detection that the human is not located within the predefined zone.

In some implementations, a personnel safety system (e.g., personnel safety system 205) can be configured to cross-verify a position of personnel (e.g., the human 109). For example, in such implementations, the personnel safety system can be configured to receive position data, including, for example, position data from the TOF sensor or the LIDAR sensor, as well as position data from a wearable device on the personnel, such as the wearable device 230. In such implementations, the personnel safety system can be configured to cross-verify the position of the personnel based on the position data from the TOF sensor or the LIDAR sensor, as well as the position data from the wearable device. Advantageously, such implementations of the personnel safety system are capable of distinguishing between personnel located in proximity in the environment, and can be implemented as a redundant measure for the sake of reliability in the position tracking determinations provided by various embodiments of the present disclosure.

Figure 4A:
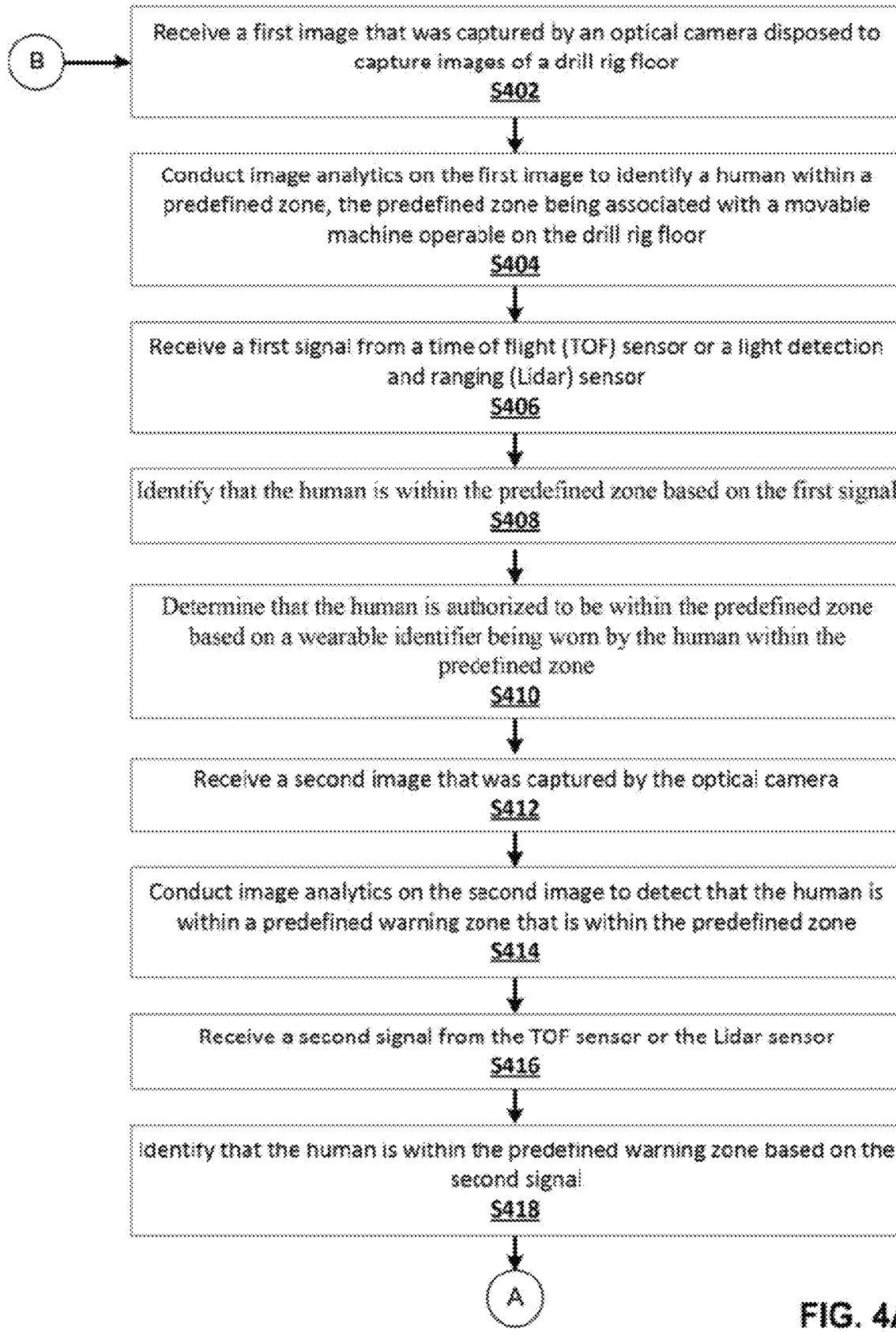
FIGS. 4A-B are flowcharts depicting operational steps of an aspect of a personnel safety system, in accordance with an embodiment.
Figure 4B:
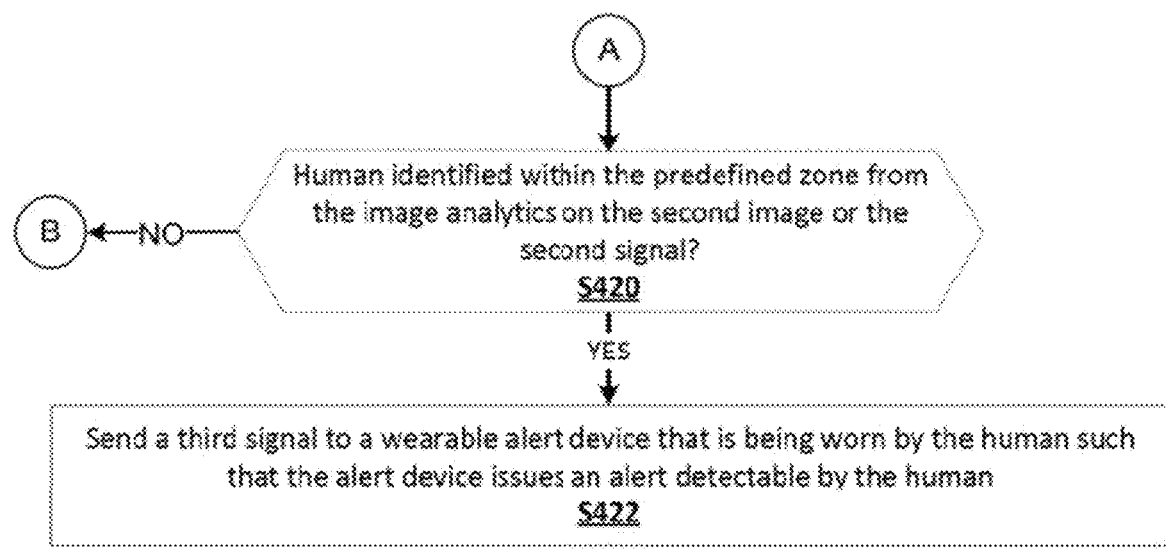

FIGS. 4A-B are flowcharts depicting operational steps of an aspect of a personnel safety system (e.g., similar to or the same as any of the personnel safety systems disclosed herein), in accordance with an embodiment.

At Step S402, the personnel safety management device 260 may receive, such as by way of the communication component 268 over the network 202, a first image that was captured by an optical camera disposed to capture images of a hazardous environment such as a drill rig floor, and/or the like.

At step S404, the personnel safety management device 260 may conduct, such as by way of the image processing component 263 resident on the processor 262, image analytics on the first image to identify a human within a virtual zone. In an embodiment, the virtual zone may be associated with a movable machine operable on the drill rig floor, a machine in motion in a hazardous environment, and the like. Each virtual zone may be defined by the zoning component 266.

At step S406, the personnel safety management device 260 may receive, such as by way of the communication component 268 over the network 202, a first signal from a TOF or LIDAR sensor (e.g., TOF or LIDAR device 220). In some implementations, the first signal can include, for example, a signal corresponding to a first set of data, including, for example, first position data. The first position data can be or include data representative of or corresponding to a position of one or more machines in motion and/or one or more humans in the hazardous environment, as described herein. For example, the first position data can include data representative of or corresponding to coordinates (e.g., 1D coordinates, 2D coordinates, 3D coordinates), including, for example, a first set of coordinates associated with a position of one or more objects, including, for example, one or more of the machines in motion and/or one or more of the humans in the hazardous environment. In some implementations, the first set of coordinates can include, for example, a 1D point cloud, a 2D point cloud, a 3D point cloud, and/or the like, as described herein. Accordingly, the first position data can be, include (e.g., data corresponding to), or be representative of coordinates of the objects in three dimensions. The coordinates can be defined with respect to any suitable type of frame of reference, in accordance with embodiments of the present disclosure. At step S408, the personnel safety management device 260 may identify and/or determine, such as by way of the image processing component 263, the identification component 264, the position determination component 265, and/or the zoning component 266 residing on the processor 262, that the human is within the virtual zone based on the first signal.

At step S410, the personnel safety management device 260 may determine, such as by way of the image processing component 263, the identification component 264, the position determination component 265, and/or the zoning component 266 residing on the processor 262, whether or not the human is authorized to be within the virtual zone based on a wearable identifier (e.g., the wearable device 230) being worn by the human within the virtual zone. For example, in some implementations, the personnel safety management device 260 may be configured to receive, from a wearable identifier (e.g., the wearable device 230), identifying information or data associated with the human, and further, to determine the authorization of the human (e.g., in a virtual zone) based on the identifying data. In some implementations, in response to a determination that the human is not authorized to be within the virtual zone based on the received data from the wearable identifier, the personnel safety management device 260 may send an alert, such as described with reference to step S422.

At step 412, the personnel safety management device 260 may receive, such as by way of the communication component 268 over the network 202, a second image that was captured by the optical camera.

At step S414, the personnel safety management device 260 may conduct, such as by way of the image processing component 263 resident on the processor 262, image analytics on the second image to detect that the human is within a virtual warning zone (e.g., virtual zone 114) that is within the virtual zone (e.g., virtual zone 112).

At step S416, the personnel safety management device 260 may receive, such as by way of the communication component 268 over the network 202, a second signal from the TOF sensor or the LIDAR sensor (e.g., TOF or LIDAR device 220). In some implementations, the second signal can include, for example, a signal corresponding to a second set of data, including, for example, second position data. The second position data can be or include data representative of or corresponding to a position of one or more machines in motion and/or one or more humans in the hazardous environment, as described herein. For example, the second position data can include data representative of or corresponding to coordinates (e.g., 1D coordinates, 2D coordinates, 3D coordinates), including, for example, a second set of coordinates associated with a position of one or more objects, including, for example, one or more of the machines in motion and/or one or more of the humans in the hazardous environment. In some implementations, the second set of coordinates can include, for example, a 1D point cloud, a 2D point cloud, a 3D point cloud, and/or the like, as described herein. Accordingly, the second position data can be, include (e.g., data corresponding to), or be representative of coordinates of the objects in three dimensions. The coordinates can be defined with respect to any suitable type of frame of reference, in accordance with embodiments of the present disclosure.

At step S418, the personnel safety management device 260 may identify and/or determine, such as by way of the image processing component 263, the identification component 264, the position determination component 265, and/or the zoning component 266 residing on the processor 262, that the human is within the virtual warning zone based on the second signal.

Referring now to FIG. 4B, at Step S420, the personnel safety management device 260 may determine, such as by way of the image processing component 263 the position determination component 265, and/or the zoning component 266 residing on the processor 262, whether the identified human is located within the virtual zone. The determination may be made based on the conducted image analytics on the second image and/or the second signal, such as at Step S414. Subsequently, if it is determined that the identified human is not located within the virtual zone, the method may proceed back to Step S402. Otherwise, if it is determined that the identified human is located within the virtual zone, the method may proceed to Step S422.

At step S422, the personnel safety management device 260 may send, such as by way of the communication component 268, a third signal to a wearable alert device (e.g., wearable device 230) that is being worn by the human such that the alert device issues an alert detectable by the human. For example, the wearable alert device can be worn by or on the human in the hazardous environment. In some implementations, the alert can include, for example, at least two of a visual alert, an audible alert, or a haptic alert.

In some implementations, the personnel safety management device 260 can be configured to compare the first position data to the second position data in determining whether the human is within the virtual zone. For example, in some embodiments, determining that the that the human is within the virtual zone based on the first signal (e.g., as in S408) and determining that the human is within the virtual zone based on the second signal (e.g., as in S418) can include, for example, comparing the first position data to the second position data to identify a match between the first position data and the second position data. For example, the match can be identified in response to determining that the first position data and the second position data represent or correspond to a similar or substantially coinciding or identical coordinate and/or position, in which the distance between such coordinate(s) and/or position(s) that falls below or exceeds a predetermined threshold.

In some implementations, the personnel safety management device 260 may receive, such as by way of the communication component 268 over the network 202, a third signal from a sensor operably coupled to a movable machine (e.g., from one or more of the machines in motion in the hazardous environment) and representative of a location of the movable machine within the hazardous environment. In some implementations, the third signal can include, for example, a signal corresponding to a third set of data, including, for example, third position data. The third position data can be or include data representative of or corresponding to a position of a movable machine (to which the sensor is operably coupled) from one or more of the machines in motion in the hazardous environment, as described herein. For example, the sensor can be or include, for example, an RFID device, a wireless position or positioning device, an ultra wide band technology, Bluetooth® technology, and/or the like. The sensor can otherwise be or include any other suitable type of sensor, in accordance with embodiments of the present disclosure.

In some implementations, the personnel safety management device 260 can include, for example, a set of sensors including discrete sensors operably coupled to one or more movable machines in the hazardous environment. In such implementations, the personnel safety management device 260 may receive signals (e.g., such as or similar to the third signal) from the set of sensors, and further, may be configured to determine or cross-check a reliability or accuracy of positions, velocities, and/or accelerations ("locations" or "movements") of one or more of the machines in motion in the hazardous environment.

In some implementations, the personnel safety management device 260 may send, such as by way of the communication component 268, a signal to an alert device such that the alert device issues an alert based on (1) the identified match between the first position data and the second position data, and (2) the third position data. For example, the alert device can be or include a wearable device (e.g., the wearable device 230), and/or the like, as described here. In some implementations, the personnel safety management device 260 may send the signal to the alert device such that the alert device issues the alert based on (1) the identified match between the first position data and the second position data, (2) the third position data, and (3) the second position data.

In some implementations, the personnel safety management device 260 may compare the second position data to the third position data to produce a comparison identifier. In such implementations, the personnel safety management device 260 may send the signal based on or in response to a determination that the comparison identifier meets a predetermined threshold, or otherwise exceeds or falls below the predetermined threshold, and/or the like.

For example, the predetermined threshold can be configured or defined to correspond to a minimum limit or threshold distance (e.g., a safe distance) and/or a minimum limit or threshold rate of change of the distance (e.g., a safe velocity and/or a safe acceleration) between the human and the movable machine. In some implementations, the comparison identifier can be representative of a distance (e.g., a minimum safe distance, etc.) between the human and the movable machine. Accordingly, the personnel safety management device 260 may send the signal such that the wearable alert device issues the alert (e.g., as in step S422) based on or in response to the comparison identifier meeting or falling below the predetermined threshold.

As another example, the predetermined threshold can be configured or defined to correspond to a minimum limit or threshold duration or amount of time (e.g., a safe time). In some implementations, the comparison identifier can be representative of a duration or amount of time remaining (e.g., a countdown) before the beginning of an operation to be executed by the movable machine in a region or area (e.g., in the hazardous environment 100). Accordingly, in some instances, the personnel safety management device 260 may send the signal such that the wearable alert device issues the alert (e.g., as in step S422) based on or in response to the comparison identifier meeting or falling below the predetermined threshold. In some implementations, such as in other instances, the personnel safety management device 260 may send the signal such that the wearable alert device does not issue the alert (e.g., as in step S422) based on or in response to the comparison identifier exceeding the predetermined threshold.

Figure 5:
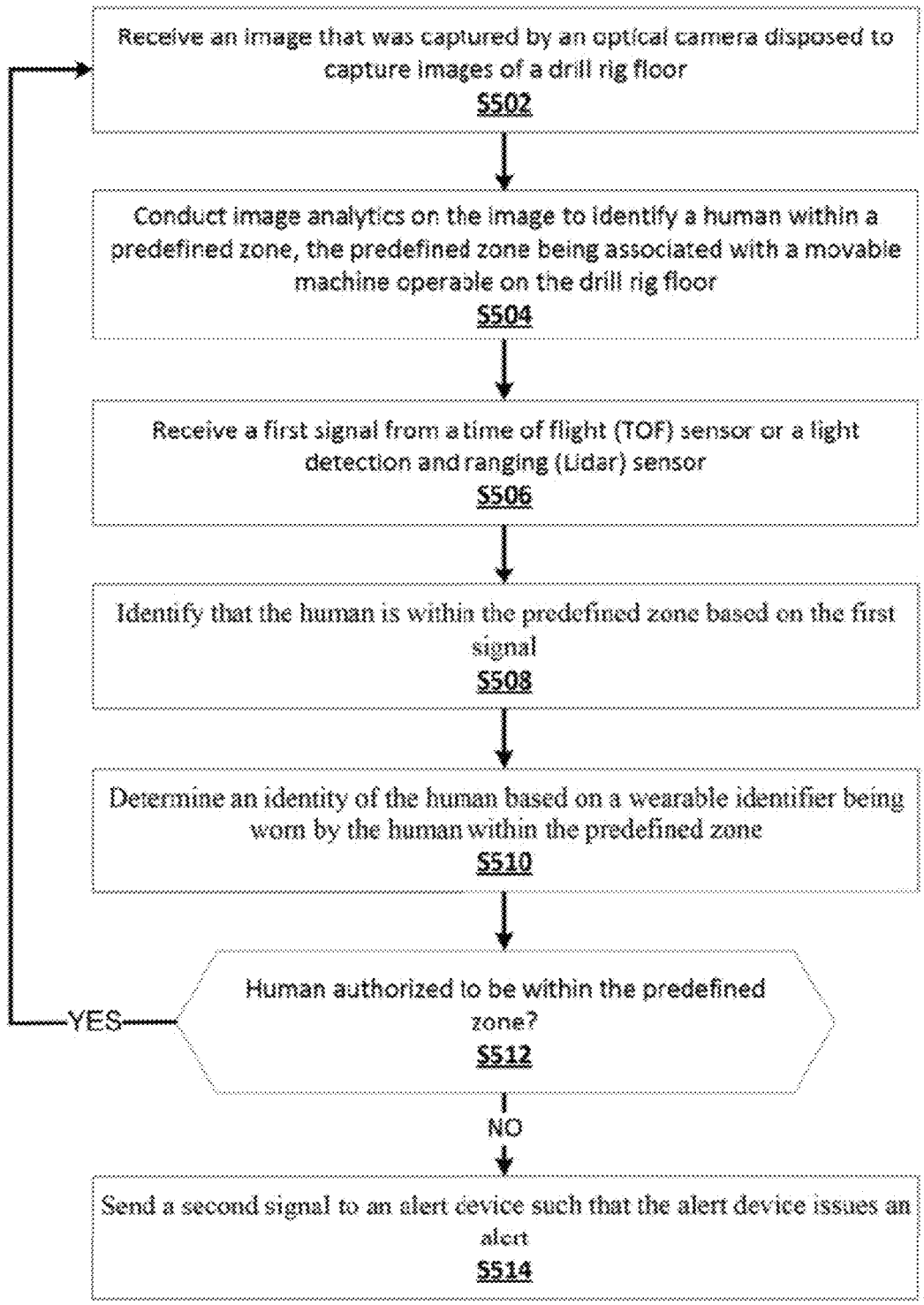
FIG. 5 is a flowchart depicting operational steps of an aspect of a personnel safety system, in accordance with an embodiment.
Figure 6A:
FIGS. 6A-E are images collectively depicting an example rendition of operational steps of an aspect of a personnel safety system, in accordance with an embodiment.
Figure 6B:
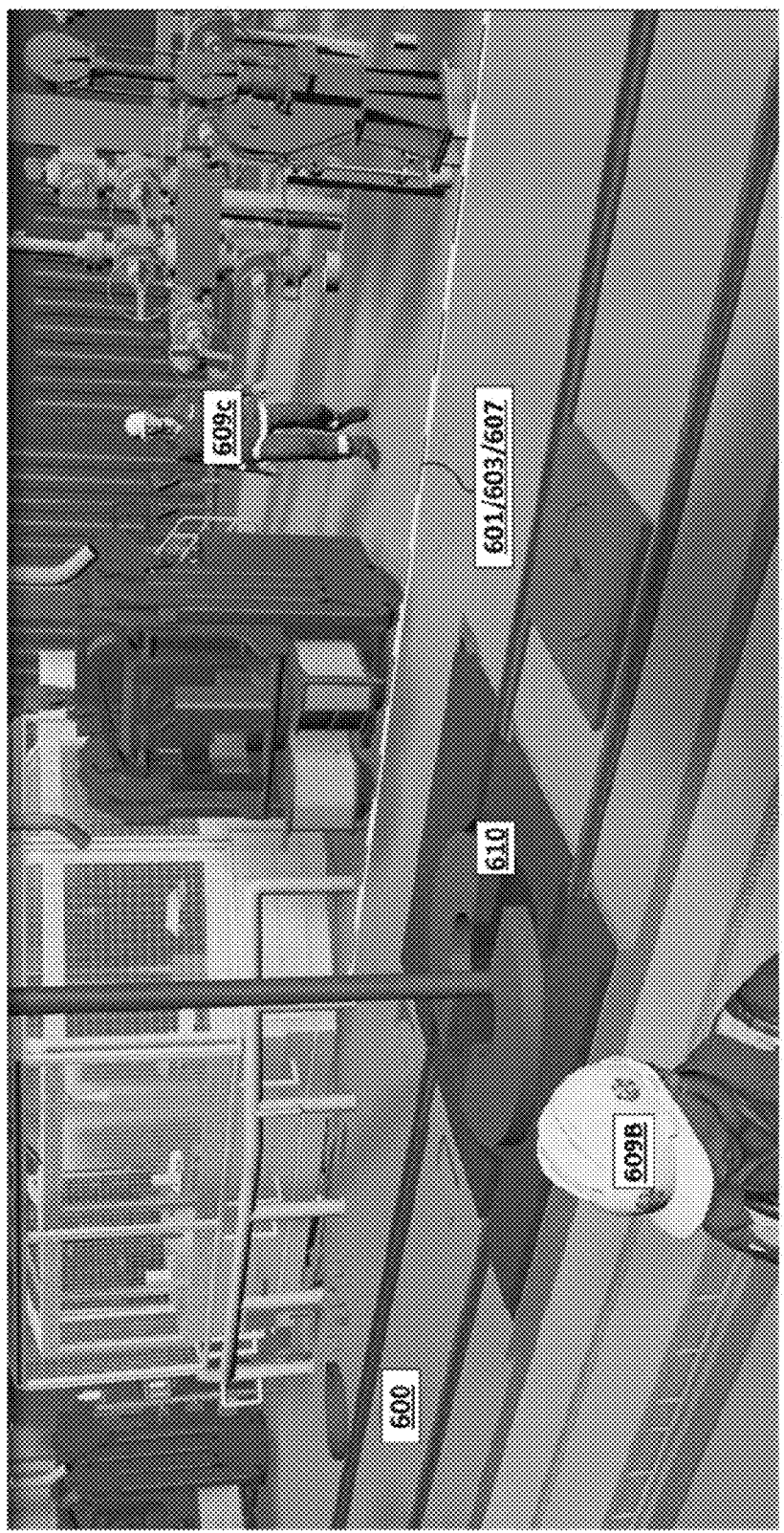
Figure 6C:
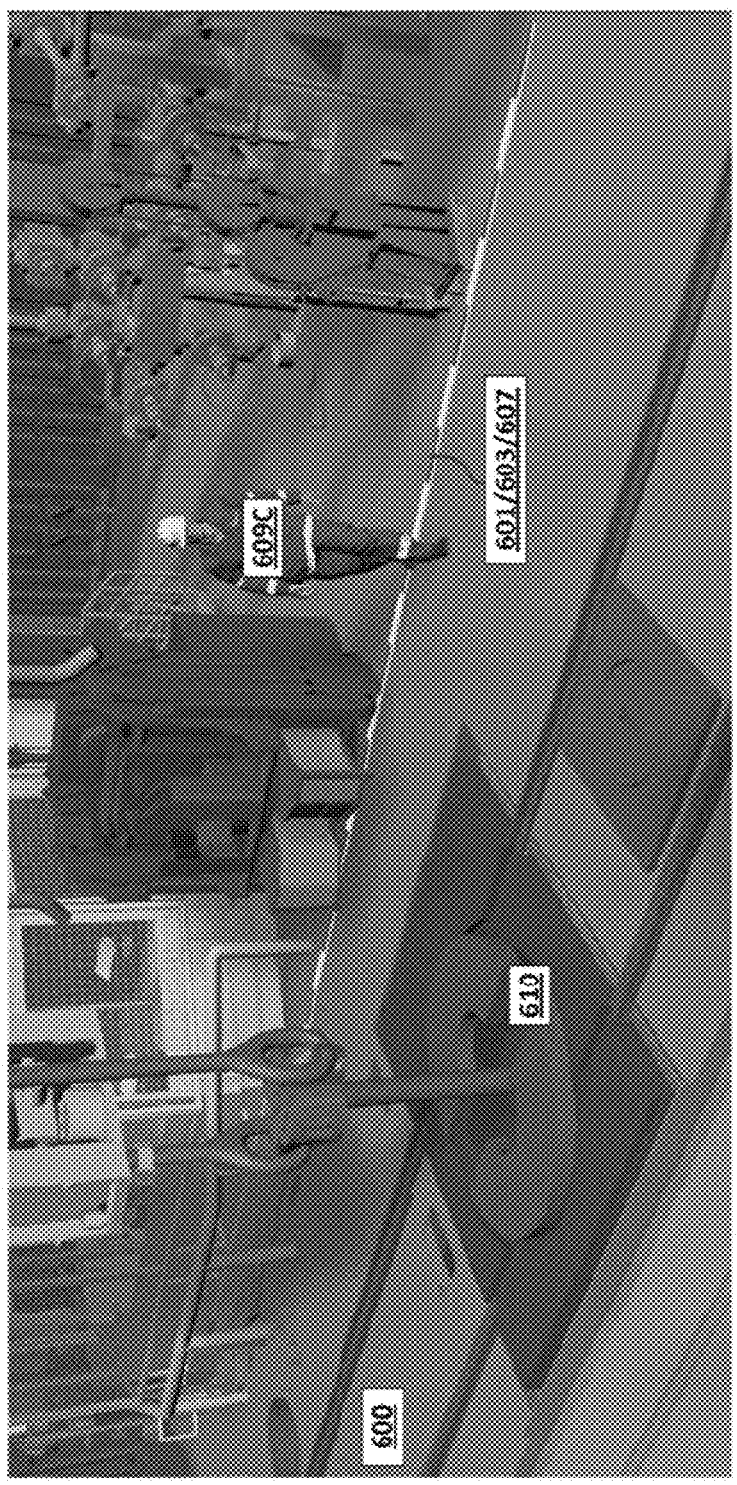
Figure 6D:
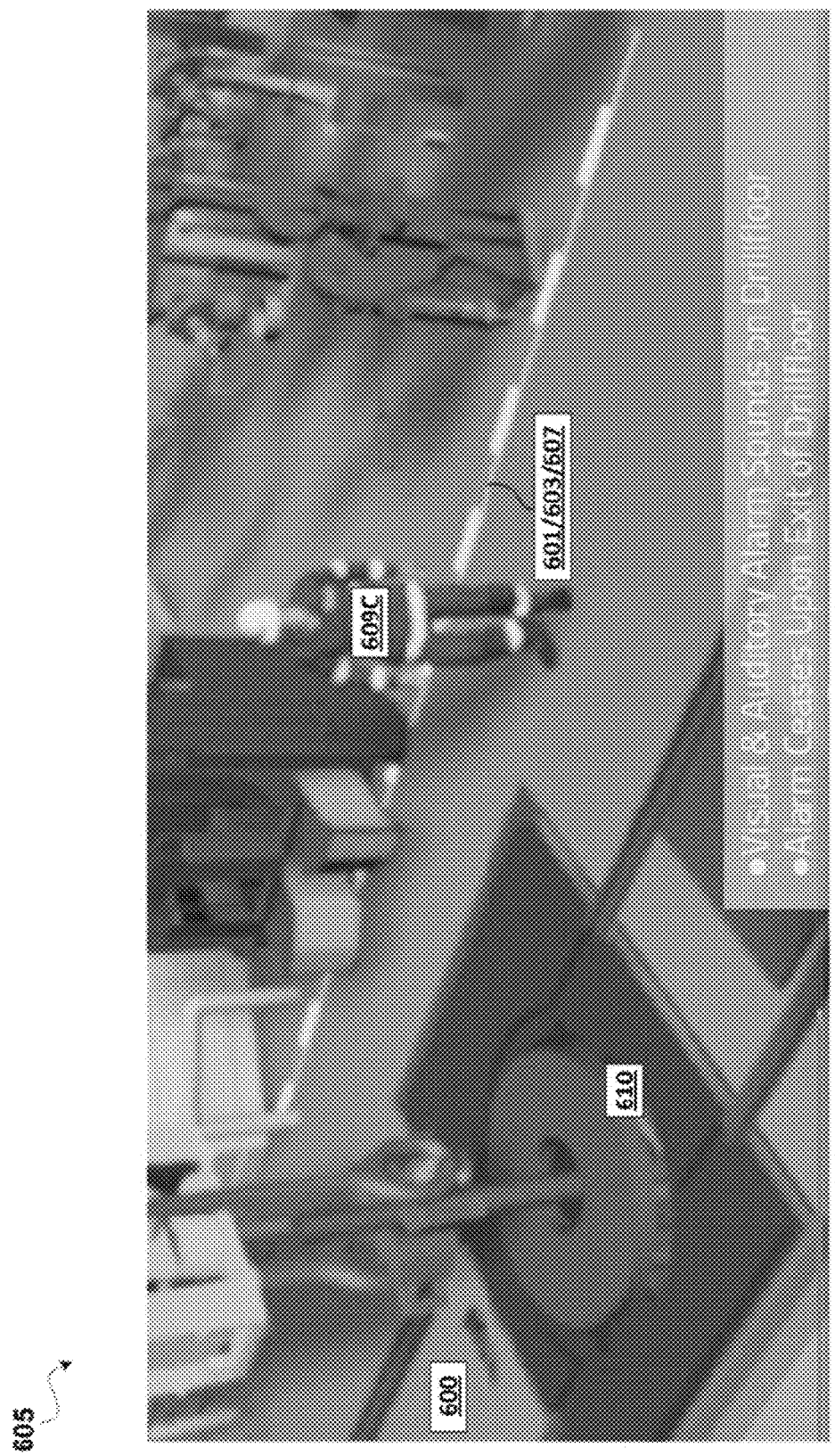
Figure 6E:
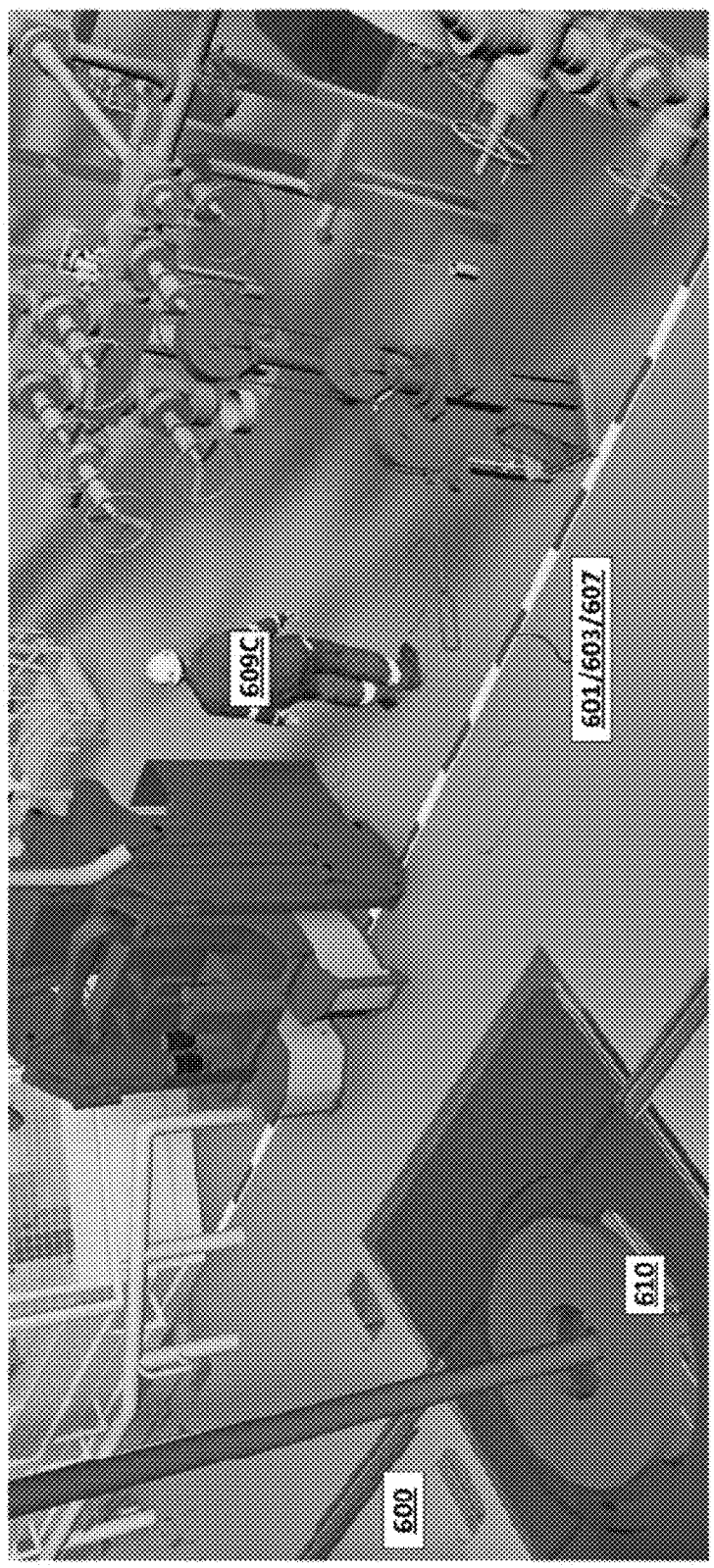

FIG. 5 is a flowchart depicting operational steps of an aspect of a personnel safety system (e.g., similar to or the same as any of the personnel safety systems disclosed herein), in accordance with an embodiment.

At step S502, the personnel safety management device 260 may receive, such as by way of the communication component 268 over the network 202, an image that was captured by an image capture device such as an optical camera disposed to capture images of a hazardous environment such as a drill rig floor. At step S504, the personnel safety management device 260 may conduct, such as by way of the image processing component 263 resident on the processor 262, image analytics on the image to identify a human within a virtual zone, where the virtual zone is associated with a movable machine operable on the drill rig floor. At step S506, the personnel safety management device 260 may receive, such as by way of the communication component 268 over the network 202, a first signal from a TOF or LIDAR sensor (e.g. TOF or LIDAR device 220). At step S508, the personnel safety management device 260 may identify and/or determine, such as by way of the image processing component 263, the identification component 264, the position determination component 265, and/or the zoning component 266 residing on the processor 262, that the human is within the virtual zone based on the first signal.

At step S510, the personnel safety management device 260 may determine, such as by way of the image processing component 263 and/or the identification component 264 resident on the processor 262, an identity of the human based on a wearable identifier being worn by the human within the virtual zone.

At step S512, the personnel safety management device 260 may determine, such as by way of the image processing component 263, the identification component 264, the position determination component 265, and/or the zoning component 266 residing on the processor 262, whether the human is authorized to be within the virtual zone. In an embodiment, if it is determined that the human is not authorized to be within the virtual zone, the method may proceed to Step S512. Subsequently, if it is determined that the human is authorized to be within the virtual zone, the method may proceed back to Step S502. Otherwise, the method may proceed to Step S514, at which point the Personnel Safety System may send, such as by way of the communication component 268, a second signal to an alert device (e.g. wearable device 230) such that the alert device issues an alert. In some implementations, the alert can be or include, for example, at least two of a visual alert, an audible alert, or a haptic alert.

FIGS. 6A-E are images collectively depicting an example rendition of operational steps of an aspect of a personnel safety system 605, in accordance with an embodiment. As shown, the personnel safety system 605 may be applied in a hazardous environment 605 with respect to humans 609A-C (e.g. personnel), a defining boundary 601, an entry/exit 603, and a defining boundary 607. As shown, the personnel safety system 605 may be implemented in accounting of positions of individual people relative to machines in a hazardous environment 600. For example, FIGS. 6A-E depict identification of human 609C, determination of non-authorized status in the hazardous environment 600, and issuance of an alarm or notification by which the human 609C may proceed back to safety (e.g. back over the defining boundary 601).

Figure 7A:
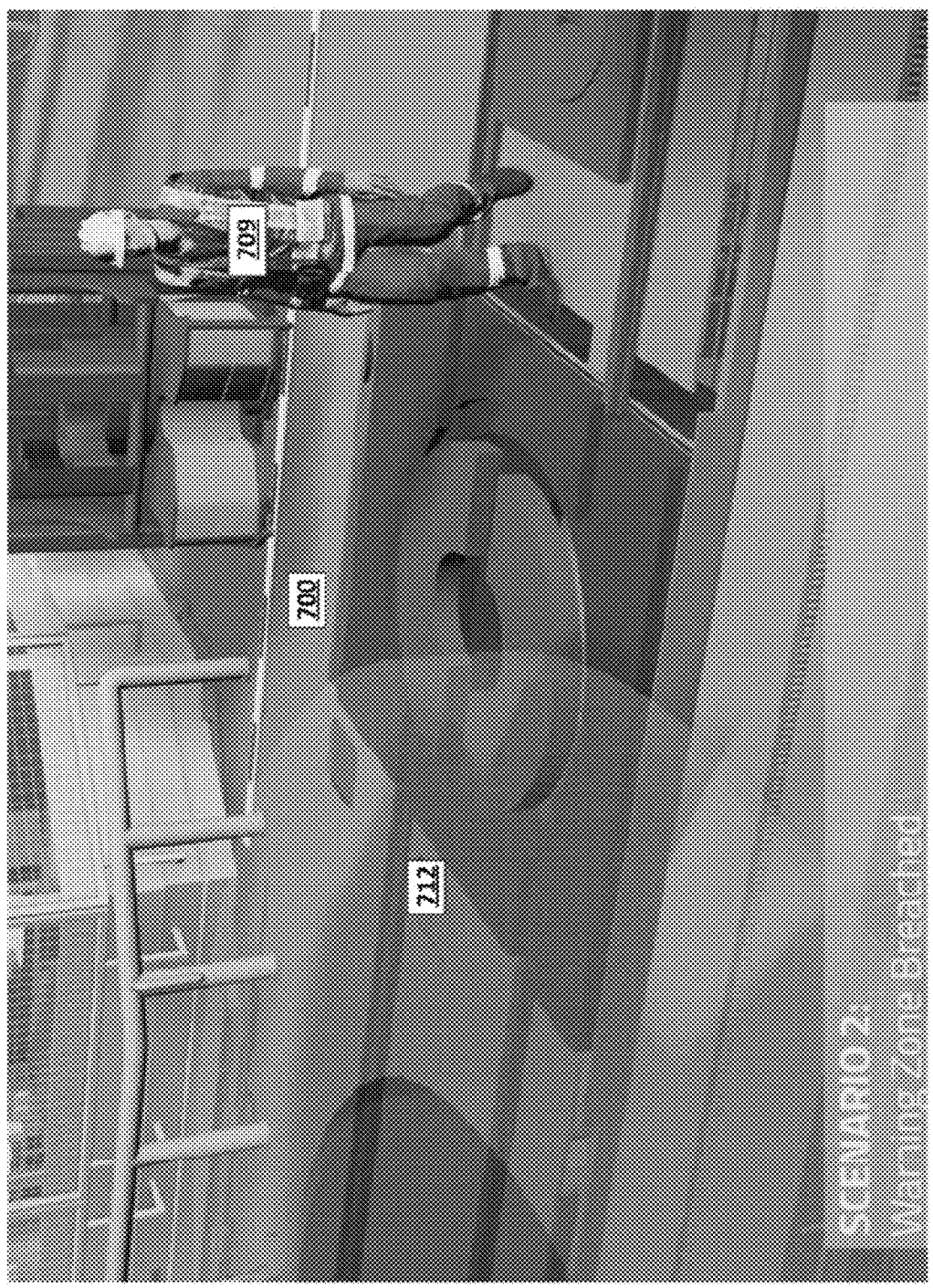
FIGS. 7A-B are images collectively depicting an example rendition of operational steps of an aspect of a personnel safety system, in accordance with an embodiment.
Figure 7B:

FIGS. 7A-B are images collectively depicting an example rendition of operational steps of an aspect of a personnel safety system 705, in accordance with an embodiment. Personnel safety system 705 can be the same as or similar to, and function the same as or similar to, any of the personnel safety systems described herein (e.g., personnel safety system 105, 205, etc.). As shown, the operational steps may include detecting an occurrence of a "warning zone breach" of first virtual zone 712 by human 709, as shown in FIG. 7B. The personnel safety system 705 may, in response to detecting the breach, perform a remediation action such as by issuing a visual, auditory, and/or tactile alert with respect to the breach, as described in other embodiments.

Figure 8A:
FIGS. 8A-B are images collectively depicting an example rendition of operational steps of an aspect of a personnel safety system, in accordance with an embodiment.
Figure 8B:
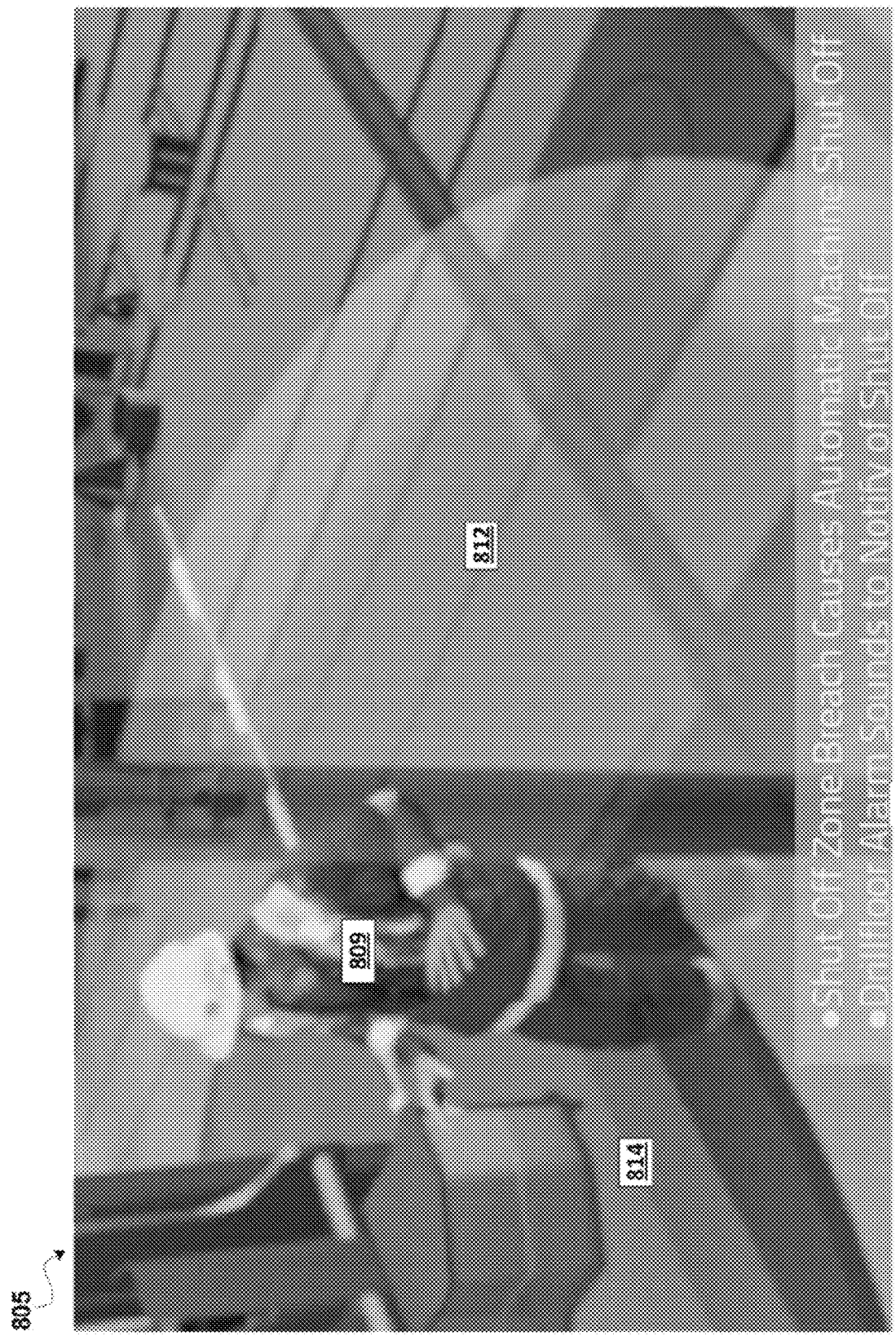

FIGS. 8A-B are images collectively depicting an example rendition of operational steps of an aspect of a personnel safety system 805, in accordance with an embodiment. Personnel safety system 805 may be the same as or similar to, and function the same as or similar to, any of the personnel safety systems described herein (e.g., personnel safety system 105, 205, 705, etc.). As shown, the operational steps may include detecting an occurrence of a "machine shut off zone breach." The machine shut off zone breach may also be referred to as a "danger zone breach." Accordingly, upon breach of the danger zone 814, the personnel safety system 805 may perform a remedial action, including, for example, automatic shut off equipment (e.g., shutdown machine 810) relative to both un-authorized personnel and location.

In an embodiment, the personnel safety system may be implemented to identify non-authorized personnel on the Drill Floor and ensure only those strictly required for the operation can be present; issue a personal alarm when an outer warning boundary is breached; and when an inner danger boundary is breached, sound an area alarm and stop equipment. These additional safeguards are intended to further reduce the risks associated in drilling activities to as low as reasonably practicable.

Figure 9:
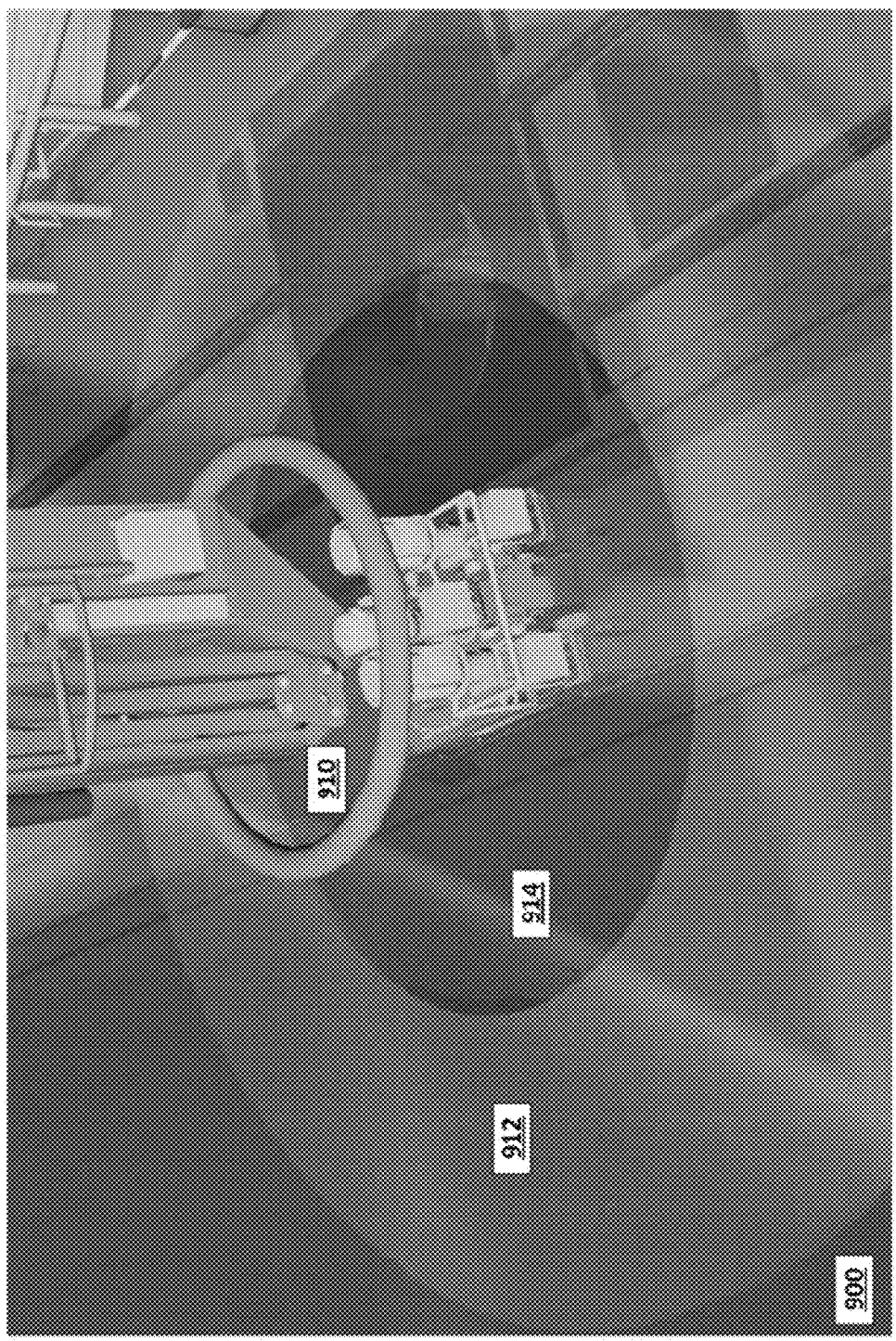
FIG. 9 is an image depicting an example rendition of a personnel safety system applied to a hazardous environment with respect to a machine, in accordance with an embodiment.

FIG. 9 is an image depicting an example rendition of a personnel safety system 905 applied to a hazardous environment 900 with respect to a machine 910, in accordance with an embodiment. Personnel safety system 905 may be the same as or similar to, and function the same as or similar to, any of the personnel safety systems described herein (e.g., personnel safety system 105, 205, 705, 805, etc.). As shown, the machine 910 may be encompassed by an inner danger zone 914 and an outer warning zone 912. The machine 910 may be a machine in motion such as described herein.

In some implementations, the inner danger zone 914 may be a virtual zone such as the first virtual zone 112 and the outer warning zone 912 may be a virtual zone such as the second virtual zone 114, as previously described. The inner danger zone 914 and the outer warning zone 912 may each be associated with and defined relative to the machine 910, and represent zones adjacent to and/or within which contact between the machine 910 and a human (e.g. human 109) is of concern. For example, the inner danger zone 914 and the outer warning zone 912 may be respectively defined by one or more virtual volumes having one or more breachable perimeters corresponding to proximities to the machine 910 that may be hazardous or dangerous. In some implementations, for example, the outer warning zone 912 may define and correspond to outer bounds of a warning zone (e.g. within which there may be a moderate risk of collision with machine 910), and the inner danger zone 914 may define and correspond to outer bounds of a danger zone (e.g. within which there may be a high or higher risk of collision with machine 910 relative to that in the warning zone).

In some implementations, the inner danger zone 914 and the outer warning zone 912 may be individually and respectively defined to encompass the machine 910 as a function of one or more motion and/or machine characteristics of the machine 910, as described herein. In some implementations, the inner danger zone 914 and/or the outer warning zone 912 may be defined to dynamically vary in characteristics so as to dynamically encompass the machine 910, as described herein. Generally, the inner danger zone 914 and the outer warning zone 912 may otherwise be defined in any suitable manner that promotes safety within the hazardous environment 900, as described herein.

Figure 10:
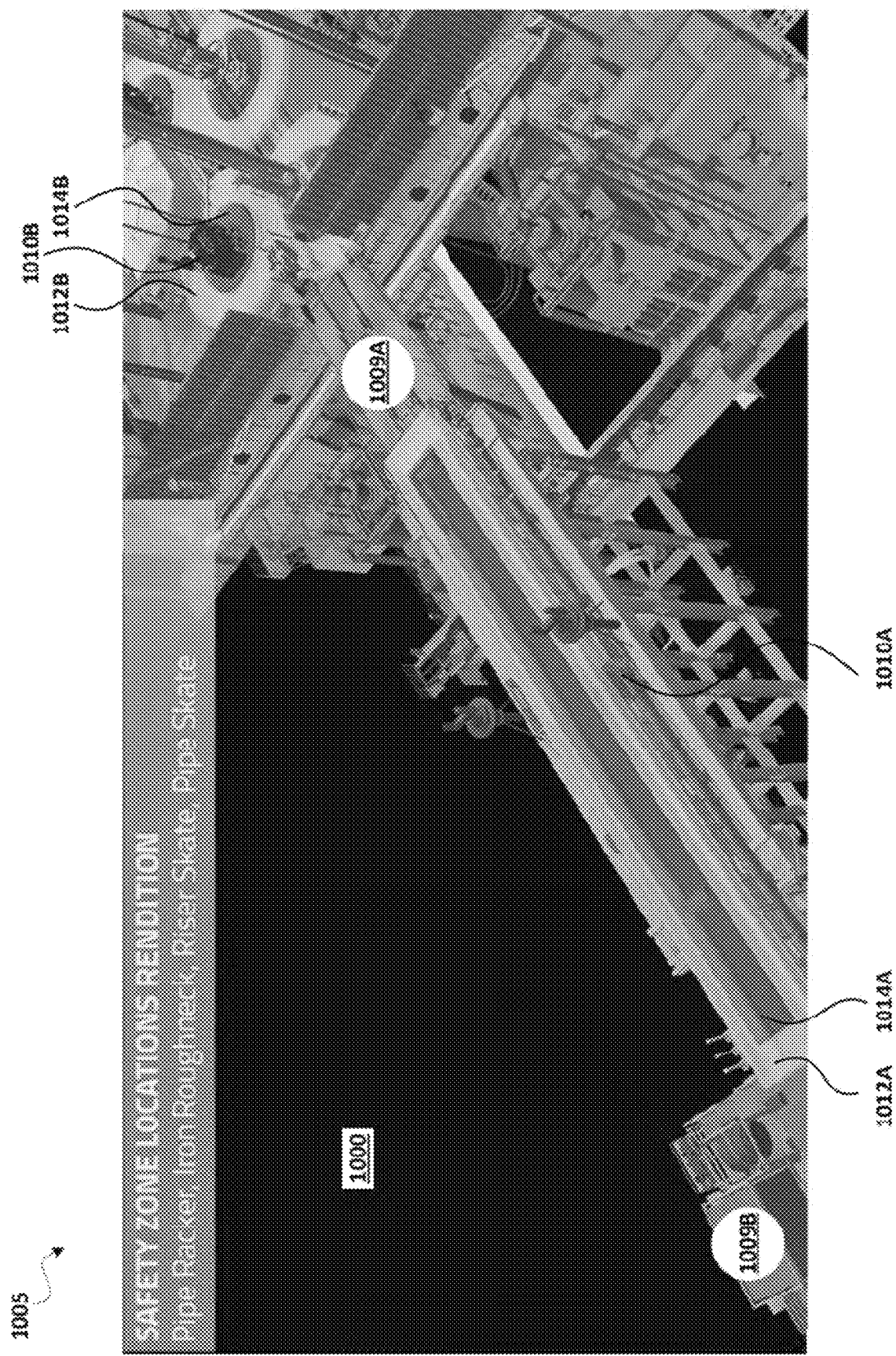
FIG. 10 is an image depicting an example rendition of a personnel safety system applied to a hazardous environment, in accordance with an embodiment.

FIG. 10 is an image depicting an example rendition of a personnel safety system 1005 applied to a hazardous environment 1000, in accordance with an embodiment. The personnel safety system 1005 may be concurrently applied to multiple machines in motion (e.g. machines in motion 1010A-B), and multiple personnel (e.g. humans 1009A-B). As shown, the machines in motion 1010A-B may be encompassed by an inner danger zone (e.g. virtual zone 114, 1014A-B) and an outer warning zone (e.g. virtual zone 112, 1012A-B), as previously described. Further, each virtual zone may encompass a respective machine in motion based on one or more machine characteristics and/or one or more motion characteristics, as previously described. For example, the machine 110A may be associated with and encompassed by three-dimensional rectangular volumes 1012A and 1014A, as shown. Further, each virtual zone may include one or more safe zones, as previously described. In general, the personnel safety system 1005 may be applied to any type of hazardous environment, as described herein. In some implementations, the personnel safety system 1005 can be configured to additionally or alternatively define one or more no-go zones (not shown) such as no-go zone 111, as shown and described herein with reference to FIG. 1.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The presently disclosed invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the presently disclosed invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
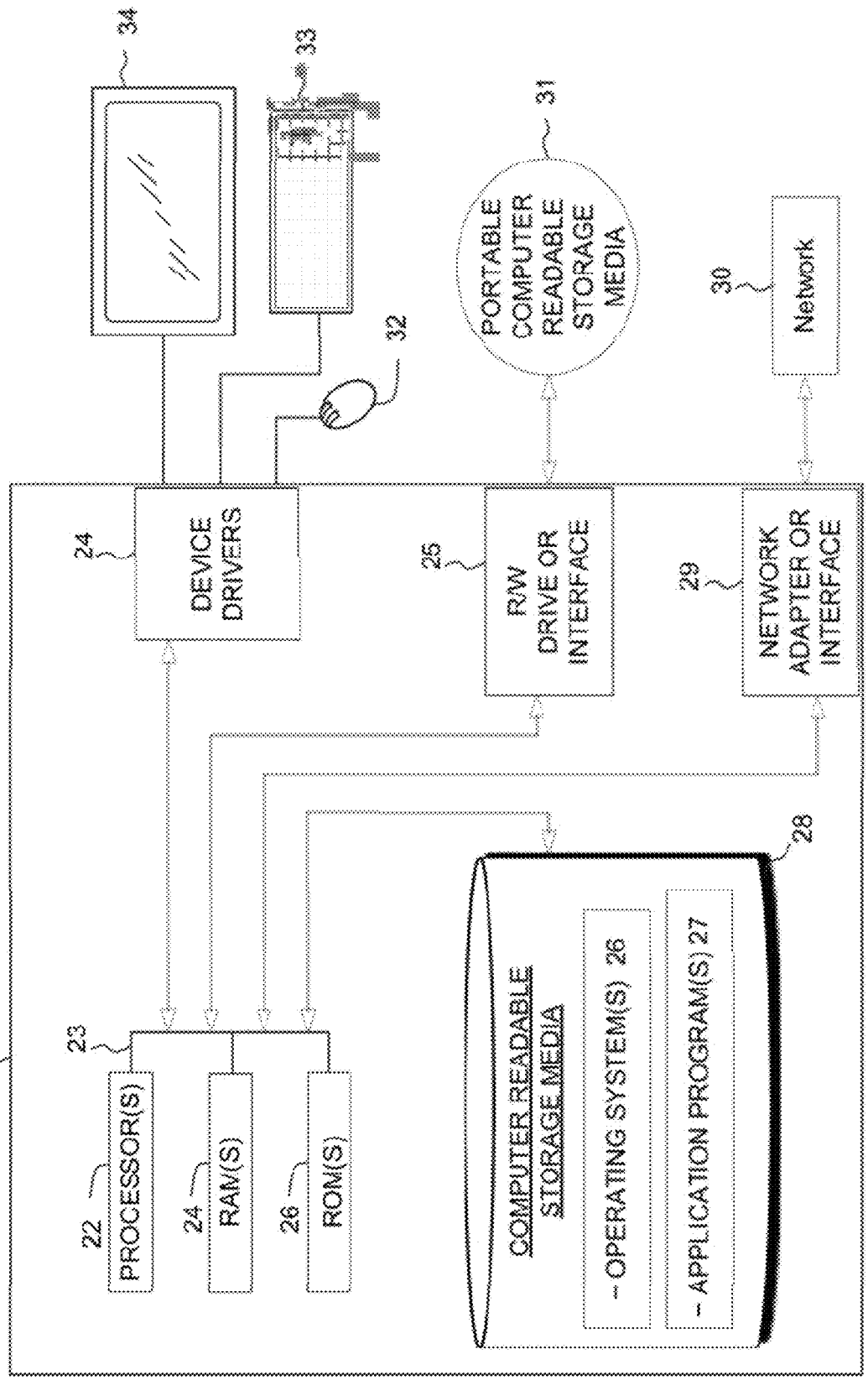
FIG. 11 is a block diagram depicting examples of an optical camera device, a TOF or LIDAR device, a wearable device, a remediation device, and/or a personnel safety device, in accordance with an embodiment.

For example, FIG. 11 is a block diagram depicting examples of the optical camera device 210, the TOF or LIDAR device 220, the wearable device 230, and/or the personnel safety management device 260, in accordance with an embodiment. As shown, the optical camera device 210, the TOF or LIDAR device 220, the wearable device 230, and/or the personnel safety management device 260 ("collectively referred to herein as "personnel safety system components") may include one or more processors 22, one or more computer-readable RAMs 24, one or more computer-readable ROMs 26, one or more computer readable storage media, one or more device drivers 24, a read/write drive or interface 25, a network adapter or interface 29, all interconnected over a communications fabric 26. The network adapter 29 communicates with a network 30 (e.g. network 202). Communications fabric 23 may be implemented with any architecture designed for passing data and/or control information between processors (such as microprocessors, communications and network processors, etc.), system memory, peripheral devices, and any other hardware components within a system.

One or more operating systems 26, and one or more application programs 27, such as may be hosted by the processor 262, as shown in FIG. 2, are stored on one or more of the computer readable storage media for execution by one or more of the processors 22 via one or more of the respective RAMs 24 (which typically include cache memory). In the illustrated embodiment, each of the computer readable storage media may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

One or more of the personnel safety system components may also include a R/W drive or interface 25 to read from and write to one or more portable computer readable storage media 31. Application programs 27 on client device 110 and/or contract audit management device 130 may be stored on one or more of the portable computer readable storage media 926, read via the respective R/W drive or interface 25 and loaded into the respective computer readable storage media 908. One or more of the personnel safety system components may also include a network adapter or interface 29, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 27 may be downloaded to the computing device from an external computer or external storage device via a network (for example, the Internet, a local area network or other wide area network or wireless network) and network adapter or interface 916. From the network adapter or interface 29, the programs may be loaded onto computer readable storage media. The network may comprise copper wires, optical fibers, wireless transmission, routers, firewalls, switches, gateway computers and/or edge servers. One or more of the personnel safety system components may also include a display screen 34, a keyboard or keypad 33, and a computer mouse or touchpad 32. Device drivers 24 interface to display screen 34 for imaging, to keyboard or keypad 33, to computer mouse or touchpad 32, and/or to display screen 34 for pressure or capacitive sensing of alphanumeric character entry and user selections. The device drivers 24, R/W drive or interface 25 and network adapter or interface 25 may include hardware and software (e.g. stored on computer readable storage media and/or ROM 26).

One or more of the personnel safety system components can be implemented via a standalone network server, or represent functionality integrated into one or more network systems. In certain embodiments, one or more of the personnel safety system components represents computer systems utilizing clustered computers and components to act as a single pool of seamless resources when accessed through a network, such as a LAN, WAN, or a combination of the two. This implementation may be preferred for data centers and for cloud computing applications. In general, one or more of the personnel safety system components can be any programmable electronic device, or can be any combination of such devices.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows: on-demand self-service: a cloud consumer can unilaterally provision computing capabilities, such as server time and network storage, as needed automatically without requiring human interaction with the service's provider; broad network access: capabilities are available over a network and accessed through standard mechanisms that promote use by heterogeneous thin or thick client platforms (e.g., mobile phones, laptops, and PDAs); resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter); rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time; and measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
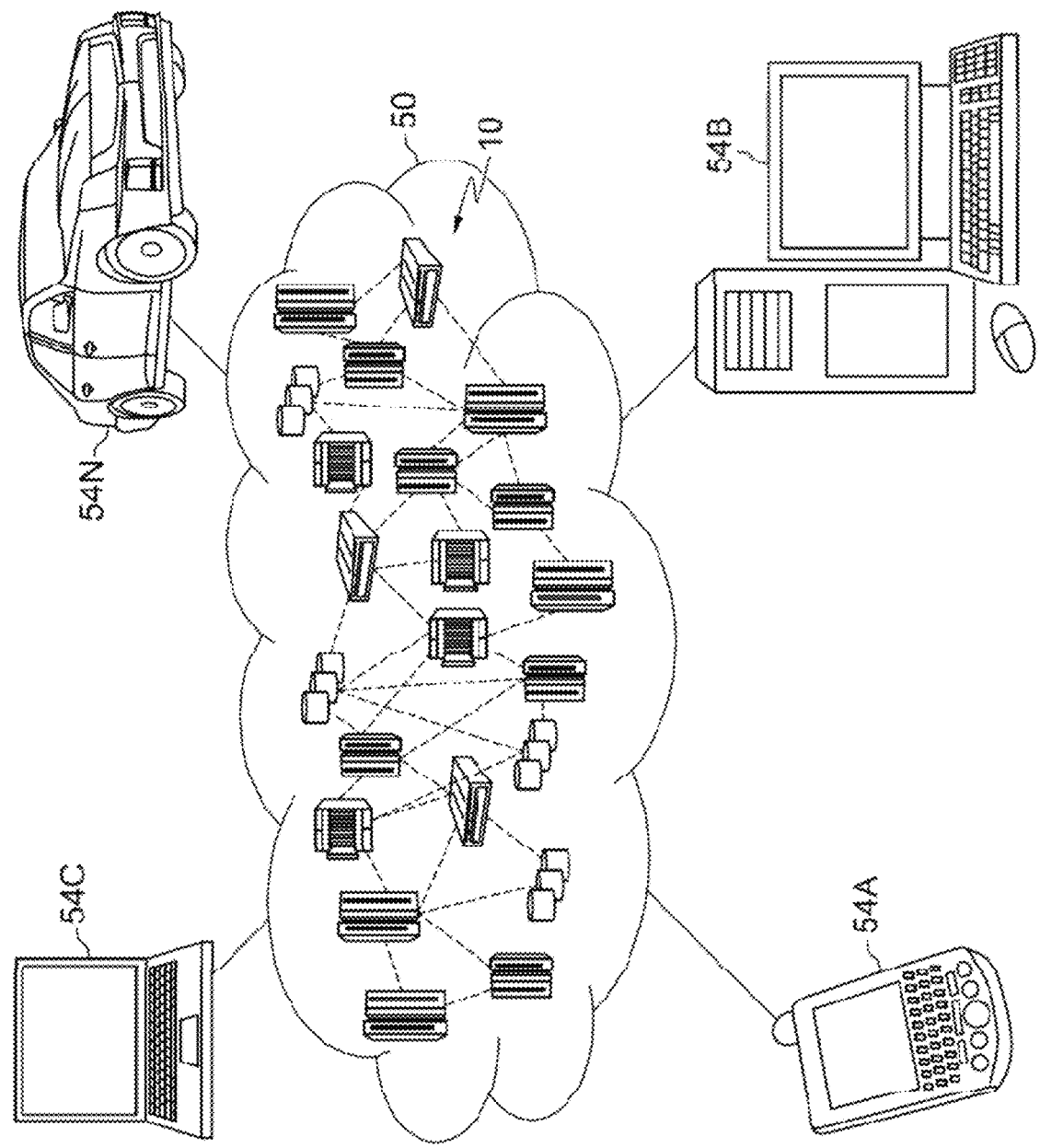
FIG. 12 depicts a cloud computing environment, in accordance with an embodiment.

Referring now to FIG. 12, illustrative a cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
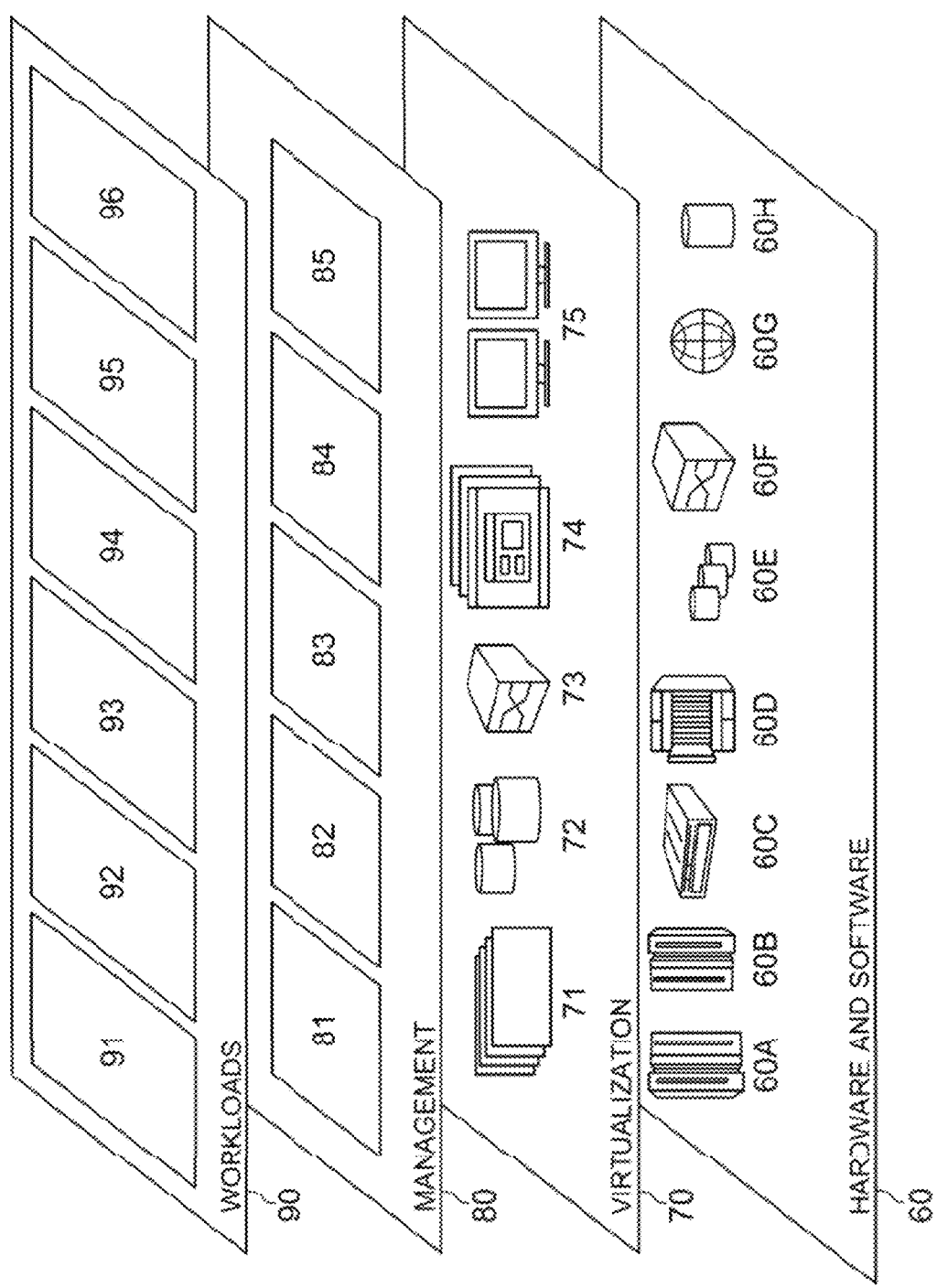
FIG. 13 depicts abstraction model layers, in accordance with an embodiment.

Referring now to FIG. 13, a set of functional abstraction layers (as may be provided by cloud computing environment 50) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components 60A-H. Examples of hardware components include: mainframes 60A; RISC (Reduced Instruction Set Computer) architecture based servers 60B; servers 60C; blade servers 60D; storage components 60E, and networks components 60F. In some embodiments, software components include network application server software 60G and database software 60H.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; personnel safety and collision avoidance system 96. Personnel safety and collision avoidance system 96 may include functionality enabling the cloud computing environment to perform and/or to carry out aspects of the present disclosure.

Detailed embodiments of the present disclosure are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present disclosure.

References in the specification to "one embodiment," "an embodiment," "an example embodiment," or the like, indicate that the embodiment described may include one or more particular features, structures, or characteristics, but it should be appreciated that such particular features, structures, or characteristics may or may not be common to each and every disclosed embodiment of the present as disclosed herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with one or more other embodiments, where applicable, whether explicitly described, or not.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Detailed embodiments of the present disclosure are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present disclosure.

References in the specification to "one embodiment," "an embodiment," "an example embodiment," or the like, indicate that the embodiment described may include one or more particular features, structures, or characteristics, but it should be appreciated that such particular features, structures, or characteristics may or may not be common to each and every disclosed embodiment of the presently disclosed invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with one or more other embodiments, where applicable, whether explicitly described, or not.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While the presently disclosed invention has been shown and described with reference to certain exemplary or example embodiments thereof, it will be understood by those skilled in the art that various changes in form and details may be made therein without departing from the spirit and scope of the present disclosure as defined by the appended claims and their equivalents. Therefore, the present disclosure has been disclosed by way of example for purposes of illustration, and not limitation.

The invention claimed is:

1. A non-transitory processor-readable medium storing code representing instructions to be executed by a processor, the code comprising code to cause the processor to:
receive first position data associated with a plurality of wearable sensors associated with a plurality of personnel, the position data being representative of a positions of the personnel within a hazardous environment;
receive second position data representative of a virtual zone associated with a movable machine within the hazardous environment;
compare the first position data to the second position data to detect that a personnel from the plurality of personnel is within the virtual zone;
receive a signal indicative of the movable machine being commanded by a control system to move when the personnel from the plurality of personnel is within the virtual zone; and
at least one of send a signal to (1) an alert device associated with the hazardous environment such that the alert device issues an alert, or (2) the control system instructing the control system to alter the motion of the movable machine, in response to (a) the detection that the personnel is within the virtual zone, and (b) the movable machine has been commanded to move when the personnel from the plurality of personnel is within the virtual zone.

2. The non-transitory processor-readable medium of claim 1, wherein altering the motion of the movable machine includes stopping the machine, changing a direction of movement of the machine, or changing a speed of the machine.

3. The non-transitory processor-readable medium of claim 1, wherein the alert device is being worn by the personnel from the plurality of personnel.

4. The non-transitory processor-readable medium of claim 1, wherein the second position data is generated by a sensor collocated with the movable machine.

5. The non-transitory processor-readable medium of claim 1, wherein the second position data is configured to change in real-time based on at least one of movement or trajectory of the movable machine.

6. The non-transitory processor-readable medium of claim 1, wherein the virtual zone is shaped or sized based on a velocity associated with the movable machine.

7. The non-transitory processor-readable medium of claim 1, wherein the alert is at least two of a visual alert, an audible alert, or a haptic alert.

8. The non-transitory processor-readable medium of claim 1, wherein the virtual zone includes a virtual safe zone disposed therein.

9. The non-transitory processor-readable medium of claim 1, wherein the first position data includes coordinates in three dimensions and the second position data includes coordinates in three dimensions.

10. A non-transitory processor-readable medium storing code representing instructions to be executed by a processor, the code comprising code to cause the processor to:
receive, from a sensor monitoring a hazardous environment, first position data associated with a human within the hazardous environment;
receive second position data representative of a virtual zone associated with a movable machine within the hazardous environment;
compare the first position data to the second position data to detect that the human is within the virtual zone;
receive a signal indicative of the movable machine being commanded by a control system to move when the human is within the virtual zone; and
at least one of send a signal to (1) an alert device associated with the hazardous environment such that the alert device issues an alert, or (2) the control system instructing the control system to alter the motion of the movable machine, in response to (a) the detection that the human is within the virtual zone, and (b) the movable machine has been commanded to move when the human is within the virtual zone.

11. The non-transitory processor-readable medium of claim 10, wherein the sensor is a ranging sensor.

12. The non-transitory processor-readable medium of claim 11, the code further comprising code to cause the processor to receive, from an optical sensor monitoring the hazardous environment, third position data associated with the human within the hazardous environment, the code to cause the processor to compare includes code to cause the processor to compare the first position data and the third position data to the second position data to detect that the human is within the virtual zone.

13. The non-transitory processor-readable medium of claim 10, wherein the sensor is an optical sensor.

14. The non-transitory processor-readable medium of claim 10, wherein altering the motion of the movable machine includes stopping the machine, changing a direction of movement of the machine, or changed a speed of the machine.

15. The non-transitory processor-readable medium of claim 10, wherein the alert device is being worn by the human.

16. The non-transitory processor-readable medium of claim 10, wherein the second position data is generated by a sensor collocated with the movable machine.

17. The non-transitory processor-readable medium of claim 10, wherein the second position data is configured to change in real-time based on at least one of movement or trajectory of the movable machine.

18. The non-transitory processor-readable medium of claim 10, wherein the virtual zone is shaped or sized based on a velocity associated with the movable machine.

19. The non-transitory processor-readable medium of claim 10, wherein the alert is at least two of a visual alert, an audible alert, or a haptic alert.

20. A method, comprising:
receiving first position data associated with a plurality of wearable sensors associated with a plurality of personnel, the position data being representative of a positions of the personnel within a hazardous environment;
receiving second position data representative of a virtual zone associated with a movable machine within the hazardous environment;
comparing the first position data to the second position data to detect that a personnel from the plurality of personnel is within the virtual zone;

receiving a signal indicative of the movable machine being commanded by a control system to move when the personnel from the plurality of personnel is within the virtual zone; and at least one of sending a signal to (1) an alert device associated with the hazardous environment such that the alert device issues an alert, or (2) the control system instructing the control system to alter the motion of the movable machine, in response to (a) the detection that the personnel is within the virtual zone, and (b) the movable machine has been commanded to move when the personnel from the plurality of personnel is within the virtual zone.

21. The method of claim 20, wherein the sending the signal includes sending the signal to the alert device associated with the hazardous environment such that the alert device issues the alert in response to (a) the detection that the personnel is within the virtual zone, and (b) the movable machine has been commanded to move when the personnel from the plurality of personnel is within the virtual zone.

22. The method of claim 20, wherein the sending the signal includes sending the signal to the control system instructing the control system to alter the motion of the movable machine, in response to (a) the detection that the personnel is within the virtual zone, and (b) the movable machine has been commanded to move when the personnel from the plurality of personnel is within the virtual zone.

23. The non-transitory processor-readable medium of claim 20, wherein altering the motion of the movable machine includes stopping the machine, changing a direction of movement of the machine, or changed a speed of the machine.

24. The non-transitory processor-readable medium of claim 20, wherein the alert device is being worn by the personnel from the plurality of personnel.

25. The non-transitory processor-readable medium of claim 20, wherein the second position data is generated by a sensor collocated with the movable machine.

26. The non-transitory processor-readable medium of claim 20, wherein the second position data is configured to change in real-time based on at least one of movement or trajectory of the movable machine.

27. The non-transitory processor-readable medium of claim 20, wherein the virtual zone is shaped or sized based on a velocity associated with the movable machine.

28. The non-transitory processor-readable medium of claim 20, wherein the alert is at least two of a visual alert, an audible alert, or a haptic alert.

29. The non-transitory processor-readable medium of claim 20, wherein the virtual zone includes a virtual safe zone disposed therein.

* * * * *